United States Patent
Lee et al.

(10) Patent No.: US 11,780,351 B2
(45) Date of Patent: *Oct. 10, 2023

(54) DEVICE HAVING SLIDING SWITCH FOR OPERATING POWER SEAT OF VEHICLE

(71) Applicants: HYUNDAI MOTOR COMPANY, Seoul (KR); KIA CORPORATION, Seoul (KR)

(72) Inventors: Baek Hee Lee, Suwon-si (KR); Hyuk Soo Kim, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 344 days.

This patent is subject to a terminal disclaimer.

(21) Appl. No.: 17/243,879

(22) Filed: Apr. 29, 2021

(65) Prior Publication Data
US 2022/0105832 A1    Apr. 7, 2022

(30) Foreign Application Priority Data
Oct. 7, 2020  (KR) .......................... 10-2020-0129294

(51) Int. Cl.
*B60R 22/00* (2006.01)
*B60N 2/02* (2006.01)
(Continued)

(52) U.S. Cl.
CPC ............ *B60N 2/0228* (2013.01); *B60K 35/00* (2013.01); *B60N 2/0284* (2013.01); *B60N 2/12* (2013.01);
(Continued)

(58) Field of Classification Search
CPC ...... B60N 2/0228; B60N 2/0284; B60N 2/12; B60N 2/16; B60N 2/66; B60N 2/0244; B60N 2002/0264; B60N 2002/0268; B60K 35/00; B60K 2370/126; B60K 2370/143; B60K 2370/152; B60K 2370/1529; B60K 37/02; B60K 2370/139; B60K 37/04; G06F 3/03547; G06F 3/041; B60R 22/00
(Continued)

(56) References Cited

U.S. PATENT DOCUMENTS 9,102,244 B2 * 8/2015 Kawachi .............. B60N 2/0228
11,560,070 B2 * 1/2023 Lee ........................ H01H 25/04
(Continued)

FOREIGN PATENT DOCUMENTS

JP    2010-069917 A    4/2010
JP    2013-212819 A    10/2013
(Continued)

*Primary Examiner* — Shardul D Patel
(74) *Attorney, Agent, or Firm* — MCDONNELL BOEHNEN HULBERT & BERGHOFF LLP

(57) ABSTRACT

A device for operating a power seat of a vehicle, the device being able to show exact operation directions of a power seat by operation of switches to a user, and enabling the user to recognize the exact selection state and operation direction of desired switches so that the user can more conveniently use the switches by displaying one arrow showing the operation direction of the seat when each of a plurality of touch sensors, which is disposed in each of the switches of a switch module for operating the seat to show operation direction of the seat, senses a touch.

12 Claims, 23 Drawing Sheets

(51) Int. Cl.
*B60K 35/00* (2006.01)
*B60N 2/16* (2006.01)
*B60N 2/12* (2006.01)
*B60N 2/66* (2006.01)

(52) U.S. Cl.
CPC .................. *B60N 2/16* (2013.01); *B60N 2/66* (2013.01); *B60K 2370/126* (2019.05); *B60K 2370/143* (2019.05); *B60K 2370/152* (2019.05)

(58) Field of Classification Search
USPC .......................................................... 701/49
See application file for complete search history.

(56) References Cited

U.S. PATENT DOCUMENTS

| 11,584,260 | B2* | 2/2023 | Lee | ....................... H01H 25/065 |
| 2016/0193976 | A1* | 7/2016 | Wild | ....................... G06F 3/044 |
| | | | | 701/36 |
| 2022/0153171 | A1* | 5/2022 | Lee | ....................... H01H 25/065 |

FOREIGN PATENT DOCUMENTS

| KR | 2019-0046215 | A | 5/2019 |
| KR | 10-2078406 | B1 | 2/2020 |
| WO | 2004/080752 | A1 | 9/2004 |

* cited by examiner

US 11,780,351 B2

DEVICE HAVING SLIDING SWITCH FOR OPERATING POWER SEAT OF VEHICLE

CROSS REFERENCE TO RELATED APPLICATIONS

The present application claims priority to Korean Patent Application No. 10-2020-0129294, filed Oct. 7, 2020, the entire contents of which is incorporated herein for all purposes by this reference.

BACKGROUND

Field

The present disclosure relates to a device having a sliding switch for operating a power seat of a vehicle and, more particularly, to a device having a sliding switch for operating a power seat of a vehicle, the device being able to accurately show the operation directions of a power seat based on sensing by a plurality of touch sensors disposed in each of a plurality of switches for operating the power seat.

Description of the Related Art

In general, automotive power seats include a seat cushion for sitting, a seatback for leaning the back, and a headrest for supporting the neck and head, as necessary components, and further include power mechanism parts for variously adjusting the position of the seats.

In particular, a switch module for adjusting the seat cushion, the seatback, etc. to various positions is disposed on a side of the power seats.

The switch module is formed by combining several switches to adjust front-rear movement of a seat, adjust the height of a seat cushion, adjust extension of the front of the seat cushion, adjust the bolster angle of a seatback, adjust reclining of the seatback, adjust the supporting direction of a lumber support disposed in the seatback, etc.

Further, since a touch sensor is disposed in each of the switch of the switch module, when a user touches the switch by hand, the touch sensors senses the touch, and the selection state and operation direction of the switches can be displayed through a display around the driver seat.

Accordingly, the user can easily visually recognize the selection state and operation direction of the switches displayed on the display while looking at the front behind the wheel.

In other words, since the user can easily visually recognize the selection state and operation direction of the switches displayed on the display, it is possible to prevent the inconvenience of the user such as bending over and turning his/her head to the switch module to directly check the operation state of the switch module.

Meanwhile, the switch module may be composed of a first switch for adjustment in a total of six directions of adjusting the entire seat forward and rearward (in two directions), adjusting the front of the seat cushion up and down (in two directions), and adjusting the height of the seat cushion up and down (in two directions), a second switch for adjusting extension of the front of the seat cushion (in two directions), a third switch for adjusting reclining of the seatback (in two directions), a fourth switch for adjusting the bolster angle of the seatback (in two directions), and a fifth switch for adjusting the supporting direction of the lumber support (in four directions).

A touch sensor may be disposed in each of the first to fifth switches.

When a user puts his/her hand on the surface of one desired switch of the first to fifth switches, a sensing signal is output to a controller from the touch sensor in the corresponding switch, and an arrow showing the operation direction of a power seat by operation of the switch touched by the user can be displayed on the display by control of the controller.

Accordingly, the switch touched by the user is operated and the corresponding operation direction of the power seat is displayed on the display, so the user can easily visually recognize the operation direction of the power seat by the operation of the switch.

For example, when a user touches the first switch for adjustment in a total of six directions of adjusting the seat forward and rearward (in two directions), adjusting the front of the seat cushion up and down (in two directions), and adjusting the height of the seat cushion up and down (in two directions), as shown in FIG. 20, the touch sensor disposed in the first switch senses the touch and a total of six arrows showing the operation direction of the power seat by the operation of the first switch are all displayed on the display 200, whereby the user can easily visually recognize that the user has selected the first switch.

However, even though the user touches any part of the first switch, a total of six arrows showing the operation direction of the power seat by the operation of the first switch are all displayed, thus there is a defect that the exact operation direction of the first switch and the exact operation direction of the power seat that the user wants are not shown.

As for the second to fifth switches, similarly, even though a user touches any part of each of the first to fifth switches, all operation directions of the power seat by the operation of the second to fifth switches are shown by arrows, thus there is a defect that the exact operation directions of the second to fifth switches and the exact operation direction of the power seat that the user wants are not shown.

For example, even though a user puts his/her hand on the surface of the rear end of the first switch to adjust front-rear movement of the seat (for example, pushes the first switch forward), as shown in FIG. 20, a total of six arrows showing the operation direction of the power seat by operation of the first switch are all displayed on the display 200. Accordingly, there is a defect that although it is possible to recognize that the user has his/her hand on the first switch, the exact operation direction of the first switch for front-rear movement adjustment of the seat and the exact operation direction of the power seat by the operation of the first switch (e.g., front-rear movement direction of the seat) are not shown.

In other words, when a user puts his/her hand on the surface of the rear end of the first switch to adjust forward movement of the seat (e.g., pushes the first switch forward) and only one arrow showing forward movement adjustment of the seat is displayed on the display, the user can recognize the exact operation direction of the first switch for forward movement adjustment of the seat. However, since a total of six arrows showing all operable directions of the power seat by operation of the first switch are all displayed on the display, as described above, the user cannot recognize the exact operation direction of the first switch. Therefore, it is more inconvenient for the user to operate the switches.

SUMMARY

The present disclosure has been made in an effort to solve the problems of the related art and an objective of the present disclosure is to provide a device having a sliding switch for operating a power seat of a vehicle, the device being able to show exact or specific operation directions of a power seat by operation of switches to a user and enabling the user to recognize the exact selection state and operation direction of desired switches so that the user can more conveniently use the switches by displaying one arrow showing the operation direction of the power seat when each of a plurality of touch sensors, which is disposed in each of the switches of a switch module for operating the power seat to show operation direction of the power seat, senses a touch.

In order to achieve the objectives, a device having a sliding switch for operating a power seat of a vehicle includes a switch module including a plurality of sliding-type switches performing input operations to drive a seat to desired positions and in desired directions; a plurality of touch sensors disposed in each of the sliding-type switches to show an operation direction of a power seat, a main controller determining the operation direction of the power seat in response to sensing signals of touch sensors sensing a touch of the touch sensors, and a display visually showing the operation direction of the power seat determined by the main controller to a user by indicating the operation direction with one arrow.

The switch module may include a sliding-type first switch configured to move forward and backward a seat, move up and down a front of a seat cushion, and adjust a vertical height of the seat cushion, a sliding-type second switch configured to recline a seatback, a sliding-type third switch configured to extend the front of the seat cushion, a push button-type fourth switch adjusting a supporting direction of lumber supports, and a rotary knob-type fifth switch configured to adjust a bolster angle of the seatback, in which the first to fifth switches may be disposed in predetermined arrangement.

The sliding-type first switch may include a first switch cover having a plurality of touch sensor insertion grooves disposed in predetermined arrangement on an inner surface thereof, a first sub-controller disposed inside the first switch cover and connected to the main controller by a flexible cable to be able to transmit a signal, a first (1-1) touch sensor disposed in a seat cushion front-down operation region of the first switch cover and connected to the first sub-controller to be able to output a signal, a second (1-2) touch sensor disposed in a seat-down operation region of the first switch cover and connected to the first sub-controller to be able to output a signal, a third (1-3) touch sensor disposed in a seat backward-slide operation region of the first switch cover and connected to the first sub-controller to be able to output a signal, a fourth (1-4) touch sensor disposed in a seat forward-slide operation region of the first switch cover and connected to the first sub-controller to be able to output a signal, a fifth (1-5) touch sensor disposed in a seat cushion front-up operation region of the first switch cover and connected to the first sub-controller to be able to output a signal, and a sixth (1-6) touch sensor disposed in a seat cushion-up operation region of the first switch cover and connected to the first sub-controller to be able to output a signal.

The seat cushion front-down operation region may be a region defined at a front portion of a top of the first switch cover.

The seat-down operation region may be a region defined at a rear portion of the top of the first switch cover.

The seat backward-slide operation region may be a region defined at a front of the first switch cover.

The seat forward-slide operation region may be a region defined at a rear of the first switch cover.

The seat cushion front-up operation region may be a region defined at a front portion of a bottom of the first switch cover.

The seat cushion-up operation region may be a region defined at a rear portion of the bottom of the first switch cover.

The sliding-type second switch may include a second switch cover having two or more touch sensor insertion grooves on an inner surface thereof, a second sub-controller disposed inside the second switch cover and connected to the main controller through a flexible cable to be able to transmit a signal, a first (2-1) touch sensor disposed in a seatback backward-reclining operation region of the second switch cover and connected to the second sub-controller to be able to output a signal, and a second (2-2) touch sensor disposed in a seatback forward-reclining operation region of the second switch cover and connected to the second sub-controller to be able to output a signal.

The seat backward-reclining operation region may be a region defined at a front of the second switch cover.

The seat forward-reclining operation region may be a region defined at a rear of the second switch cover.

The sliding-type third switch may include a third switch cover having two or more touch sensor insertion grooves on an inner surface thereof, a first (3-1) touch sensor disposed in a backward extension operation region of the third switch cover and connected to the main controller to be able to output a signal, and a second (3-2) touch sensor disposed in a forward extension operation region of the third switch cover and connected to the main controller to be able to output a signal.

The 3-1 touch sensor and the 3-2 touch sensor may be connected to the main controller through a conductive spring to be able to transmit a signal.

The backward extension operation region may be a region defined at a front surface of the third switch cover.

The forward extension operation region may be a region defined at a rear surface of the third switch cover.

The push button-type fourth switch may include a fourth switch cover having a lumber support forward-protrusion operation region, a lumber support backward-contraction operation region, a lumber support-up operation region, and a lumber support-down operation region, a first (4-1) touch sensor disposed in the lumber support forward-protrusion operation region of the fourth switch cover and connected to the main controller to be able to output a signal, a second (4-2) touch sensor disposed in the lumber support backward-contraction operation region of the fourth switch cover and connected to the main controller to be able to output a signal, a third (4-3) touch sensor disposed in the lumber support-up operation region of the fourth switch cover and connected to the main controller to be able to output a signal, and a fourth (4-4) touch sensor disposed in the lumber support-down operation region of the fourth switch cover and connected to the main controller to be able to output a signal.

An integrated signal output path of the 4-1 touch sensor, the 4-2 touch sensor, the 4-3 touch sensor, and the 4-4 touch sensor may be connected to the main controller by a flexible cable to be able to transmit a signal.

The rotary knob-type fifth switch may include a fifth switch cover disposed at a predetermined position on an edge of the fourth switch, a first (5-1) touch sensor disposed inside a garnish plate adjacent to a first side of the fifth switch and connected to the main controller to be able to output a signal, and a second (5-2) touch sensor disposed in a garnish plate adjacent to a second side of the fifth switch cover and connected to the main controller to be able to output a signal.

The 5-1 touch sensor and the 5-2 touch sensor may be connected to the main controller through a conductive spring to be able to transmit a signal.

The present disclosure provides the following effects from the objectives described above.

First, since a plurality of touch sensors is disposed in each of switches of a switch module for operating a power seat and arrows showing the operation direction of the power seat and the operation direction of the switches are accurately displayed on a display in accordance with sensing by the touch sensors, a user can accurately recognize the operation directions of the switches for operating the power seat to desired positions and the operation direction of the power seat by the operation of the switches.

Second, a user can accurately recognize the selection state and operation directions of the switches and the operation direction of the power seat by the operation of the switches by seeing the seat and arrow images displayed on the display, whereby the user can more conveniently operate the switches.

BRIEF DESCRIPTION OF THE FIGURES

The above and other objectives, features and other advantages of the present disclosure will be more clearly understood from the following detailed description when taken in conjunction with the accompanying drawings, in which.

DETAILED DESCRIPTION

Hereinafter, exemplary embodiments of the present disclosure will be described in detail with reference to the accompanying drawings.

Figure 1:
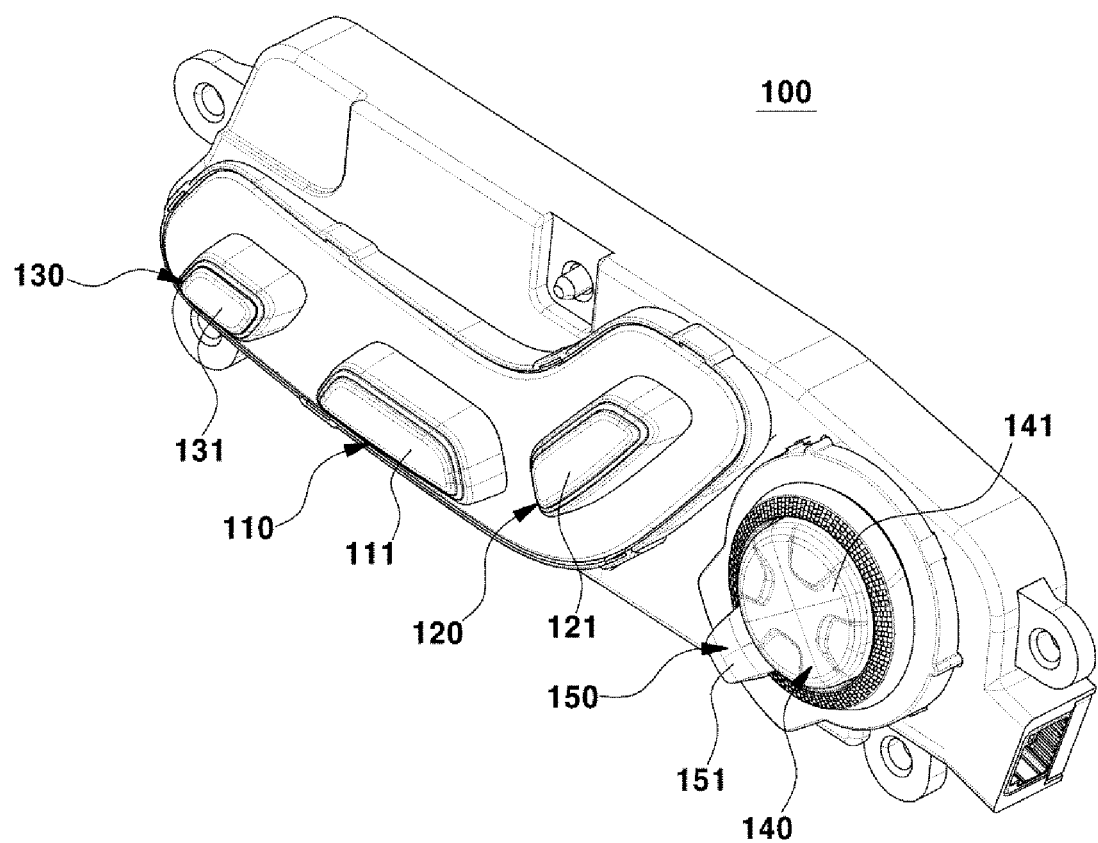
FIG. 1 is a perspective view showing a switch module of a device having a sliding switch for operating a power seat of a vehicle according to the present disclosure.

FIG. 1 shows a switch module of a device having a sliding switch for operating a power seat of a vehicle according to the present disclosure.

A switch module 100 including sliding-type first to third switches 110, 120, and 130 for operating a power seat, a push button-type fourth switch 140, a rotary knob-type fifth switch 150, etc. is disposed on a side of a seat (e.g., on a side of a seat cushion).

As shown in FIG. 1, the switch module 100 may include a sliding-type first switch 110 for adjustment in a total of six directions of adjusting an entire seat forward and rearward (in two directions), adjusting the front of a seat cushion up and down (in two directions), and adjusting the height of the seat cushion up and down (in two directions), a sliding-type second direction 120 for adjusting extension of the front of the seat cushion (in two directions), a sliding-type third switch 130 for adjusting reclining of a seatback (in two directions), a push button-type fourth switch 140 for adjusting the supporting direction of a lumber support (in four directions), and a rotary knob-type fifth switch 150 for adjusting a bolster angle of the seatback (in two directions).

The sliding-type switch is a switch that moves by pushing the switch forward and rearward or up and down, the rotary knob type is a switch that rotates, and the push button type is a switch that is vertically pushed.

In particular, a plurality of touch sensors for showing operation directions of a power seat is disposed in each of the first to fifth switches of the switch module 100.

When a sensing signal is transmitted to a controller from a touch sensor sensing a touch of the touch sensors, the controller determines the operation direction of a power seat and the operation direction of the switch corresponding to the sensing signal of the touch sensor and then transmits a control signal for displaying on a display.

The controller, as will be described below, may be composed of a sub-controller implemented in a PCB board type, and a main controller, or may be composed of a single main controller.

Accordingly, one or more arrow images showing the operation direction of the power seat and the operation direction of switches that are determined by the controller can be displayed with a seat image on the display.

Accordingly, a user can accurately recognize the selection state and operation direction of the switches and the operation direction of the power seat by the operation of the switches by looking at the seat and arrow images displayed on the display, whereby the user can more conveniently operate the switches.

Figure 2:
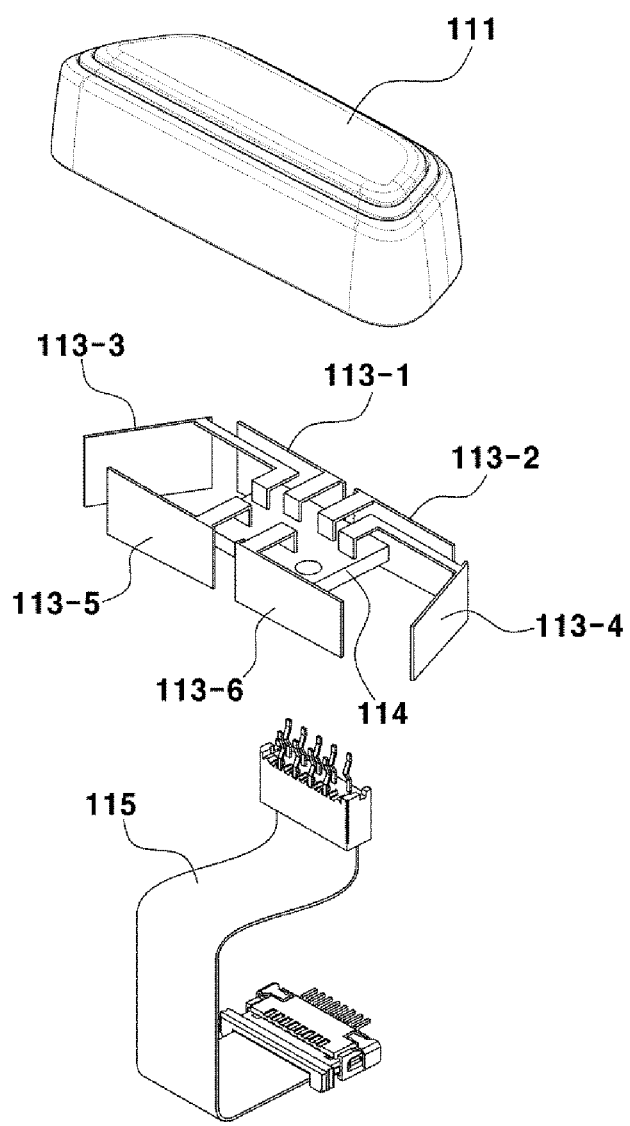
FIG. 2 is an exploded perspective view showing a first switch of the switch module according to the present disclosure.
Figure 3:
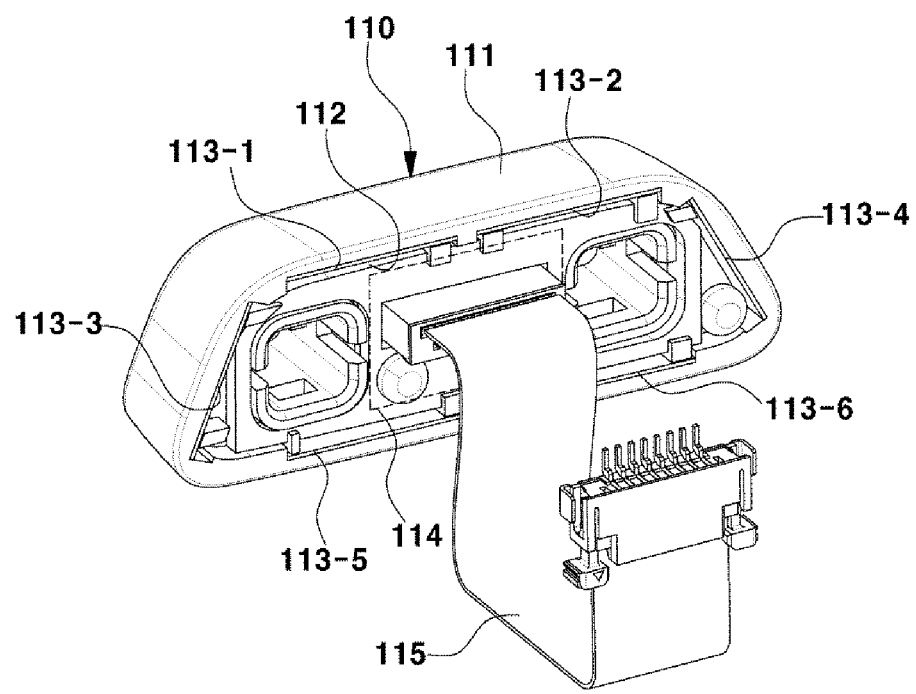
FIGS. 3 and 4 are assembled perspective views showing the first switch of the switch module according to the present disclosure.
Figure 4:
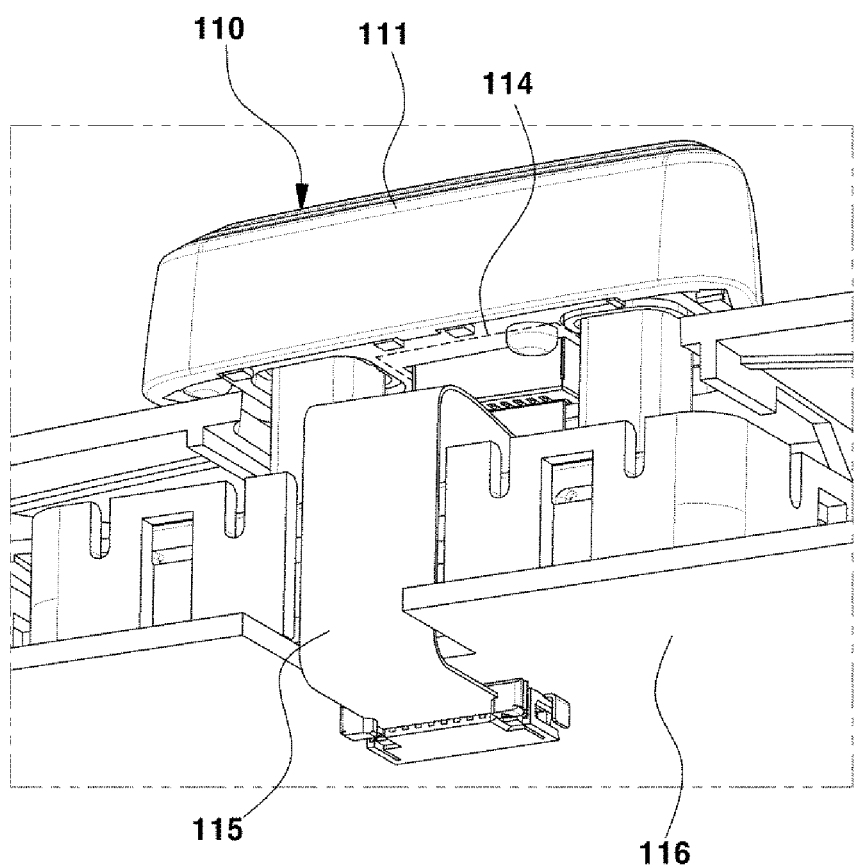

FIGS. 2 to 4 are views showing the first switch of the switch module according to the present disclosure and the assembled state, in which reference numeral 110 indicates the first switch.

The sliding-type first switch 110 is provided to operate a seat forward and rearward (in two directions), move the front of a seat cushion up and down (in two directions), and adjust the vertical height of the seat cushion (in two directions), and includes a first switch cover 111.

A plurality of touch sensor insertion grooves 112 are arranged in a predetermined way on the inner surface of the first switch cover 111.

The touch sensor insertion grooves 112 are arranged around the edges on the inner surface of the first switch cover 111.

Accordingly, a plurality of touch sensors and a first sub-controller 114 to which the touch sensors are connected to be able to output signals can be disposed inside the first switch cover 111.

As shown in FIG. 3, the touch sensors are inserted in the touch sensor insertion grooves 112 of the first switch cover 111 and the first sub-controller 114 to which the touch sensors are connected to be able to output signals is disposed at the center region of the inner surface of the first switch cover 111.

As shown in FIGS. 2 to 4, the first sub-controller 114 is connected to a main controller 116 through a flexible cable 115 to be able to transmit a signal.

The touch sensors connected to the first sub-controller 114 inside the first switch cover 111 may include a first (1-1) touch sensor 113-1, a second (1-2) touch sensor 113-2, a third (1-3) touch sensor 113-3, a fourth (1-4) touch sensor 113-4, a fifth (1-5) touch sensor 113-5, and a sixth (1-6) touch sensor 113-6.

The 1-1 touch sensor 113-1 is connected to the first sub-controller 114 to be able to output a signal and is disposed in a seat cushion front-down operation region 117-1 of the first switch cover 111, that is, in the region defined at the front portion of the top of the first switch cover 111.

Accordingly, when a user puts his/her hand on the seat cushion front-down operation region 117-1 of the first switch cover 111, the 1-1 touch sensor 113-1 therein senses the touch and a sensing signal is output from the 1-1 touch sensor 113-1 to the first sub-controller 114.

When the first sub-controller 114 receives the sensing signal from the 1-1 touch sensor 113-1, the first sub-controller 114 determines the operation direction of the power seat and the operation direction of the switch according to the sensing signal of the 1-1 touch sensor 113-1 to move down the front of the seat cushion and transmits a determination signal to the main controller 116.

Figure 5A:
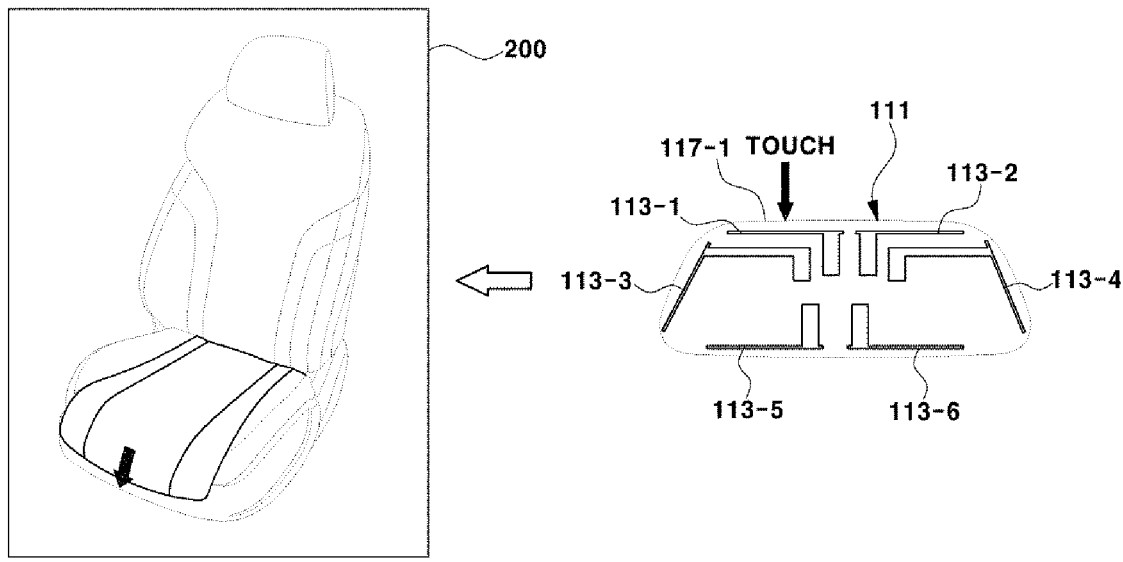
FIGS. 5A, 5B, 5C, 5D, 5E, and 5F are views showing that an image showing operation directions of a power seat is displayed in different ways on a display by sensing by six touch sensors disposed in the first switch according to the present disclosure.

Further, the main controller 116 transmits a control signal for a display instruction according to the determination signal for moving down the front of the seat cushion to the display 200. Accordingly, as shown in FIG. 5A, a seat image and one arrow image showing a seat cushion front-down direction can be displayed on the display 200.

Accordingly, when the user sees the display 200, the user can easily recognize that the front of the seat cushion can be moved down when he/she presses the first switch cover 111 with the hand on the seat cushion front-down operation region 117-1 of the first switch cover 111.

The 1-2 touch sensor 113-2 is connected to the first sub-controller 114 to be able to output a signal and is disposed in a seat-down operation region 117-2 of the first switch cover 111, that is, in the region defined at the rear portion of the top of the first switch cover 111.

Accordingly, when a user puts his/her hand on the seat-down operation region 117-2 of the first switch cover 111, the 1-2 touch sensor 113-2 therein senses the touch and a sensing signal is output from the 1-2 touch sensor 113-2 to the first sub-controller 114.

When the first sub-controller 114 receives the sensing signal from the 1-2 touch sensor 113-2, the first sub-controller 114 determines the operation direction of the power seat and the operation direction of the switch according to the sensing signal of the 1-2 touch sensor 113-2 to move down the seat and transmits a determination signal to the main controller 116.

Figure 5B:
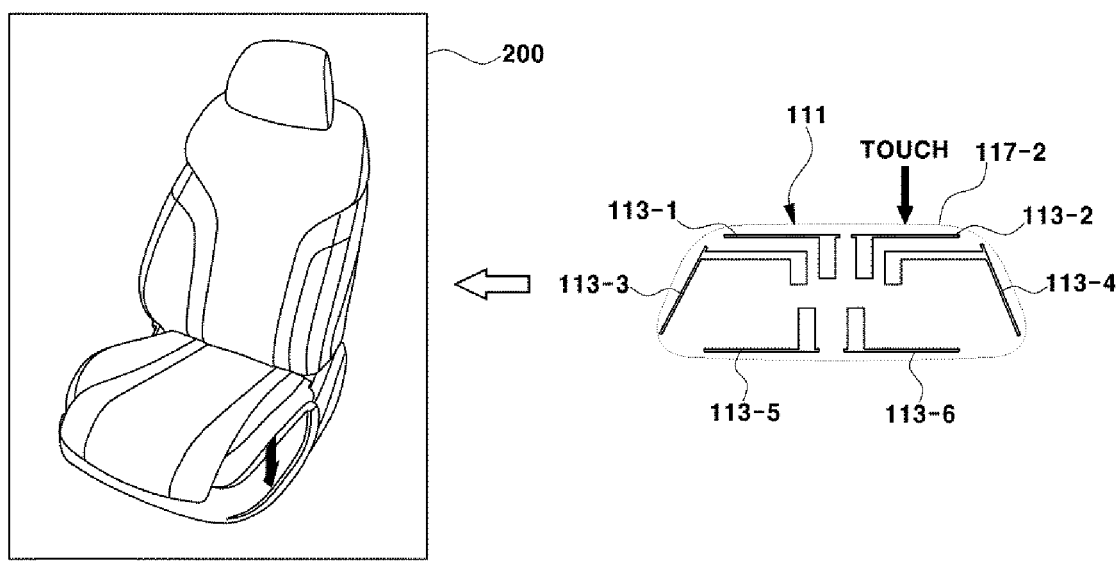

Further, the main controller 116 transmits a control signal for a display instruction according to the determination signal for moving down the seat to the display 200. Accordingly, as shown in FIG. 5B, a seat image and one arrow image showing a seat-down direction can be displayed on the display 200.

Accordingly, when the user sees the display 200, the user can easily recognize that the seat can be moved down when he/she presses the first switch cover 111 with the hand on the seat-down operation region 117-2 of the first switch cover 111.

The 1-3 touch sensor 113-3 is connected to the first sub-controller 114 to be able to output a signal and is disposed in a seat backward-slide operation region 117-3 of the first switch cover 111, that is, in the region defined at the front of the first switch cover 111.

Accordingly, when a user puts his/her hand on the seat rearward-movement operation region 117-3 of the first switch cover 111, the 1-3 touch sensor 113-3 therein senses the touch and a sensing signal is output from the 1-3 touch sensor 113-3 to the first sub-controller 114.

When the first sub-controller 114 receives the sensing signal from the 1-3 touch sensor 113-3, the first sub-controller 114 determines the operation direction of the power seat and the operation direction of the switch according to the sensing signal of the 1-3 touch sensor 113-3 to slide backward the seat and transmits a determination signal to the main controller 116.

Figure 5C:
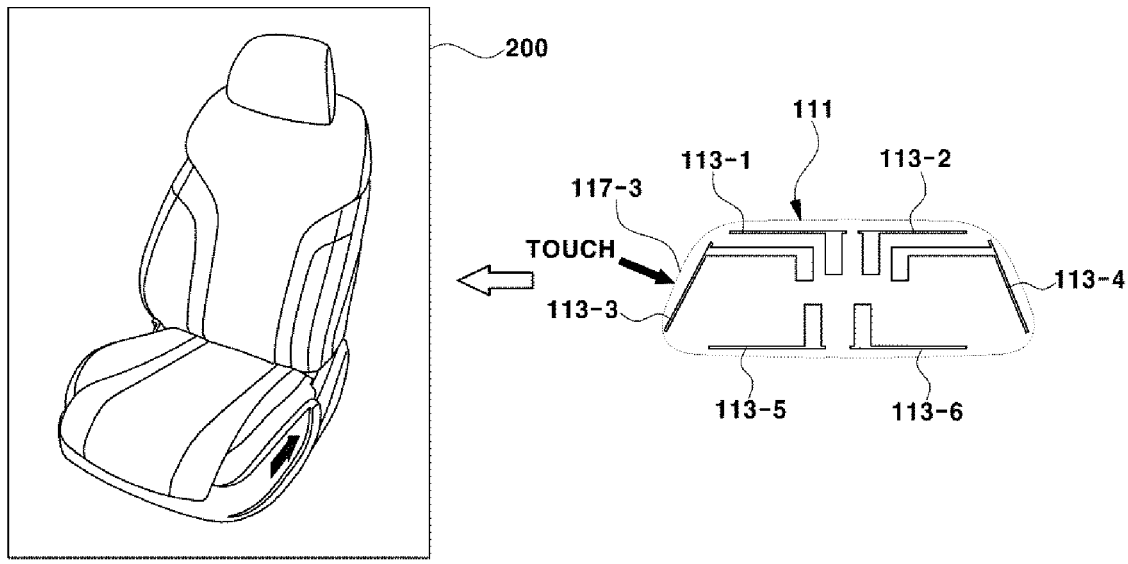

Further, the main controller 116 transmits a control signal for a display instruction according to the determination signal for sliding backward the seat to the display 200. Accordingly, as shown in FIG. 5C, a seat image and one arrow image showing a seat backward-slide direction can be displayed on the display 200.

Accordingly, when the user sees the display 200, the user can easily recognize that the seat can be moved backward when he/she presses the first switch cover 111 with the hand on the seat backward-slide operation region 117-3 of the first switch cover 111.

The 1-4 touch sensor 113-4 is connected to the first sub-controller 114 to be able to output a signal and is disposed in a seat forward-slide operation region 117-4 of the first switch cover 111, that is, in the region defined at the rear of the first switch cover 111.

Accordingly, when a user puts his/her hand on the seat forward-slide operation region 117-4 of the first switch cover 111, the 1-4 touch sensor 113-4 therein senses the touch and a sensing signal is output from the 1-4 touch sensor 113-4 to the first sub-controller 114.

When the first sub-controller 114 receives the sensing signal from the 1-4 touch sensor 113-4, the first sub-controller 114 determines the operation direction of the power seat and the operation direction of the switch according to the sensing signal of the 1-4 touch sensor 113-4 to slide forward the seat and transmits a determination signal to the main controller 116.

Figure 5D:
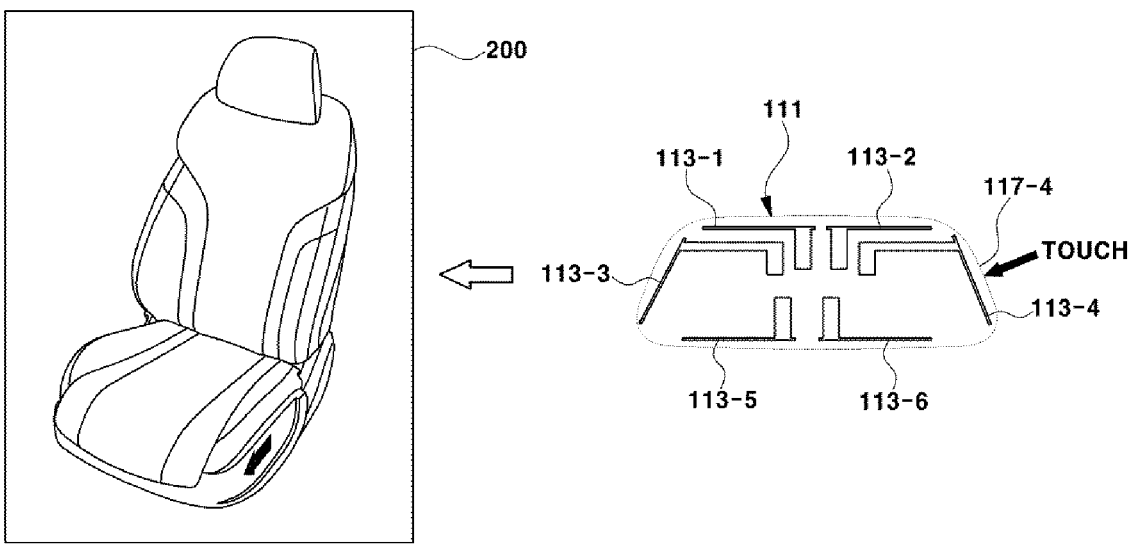

Further, the main controller 116 transmits a control signal for a display instruction according to the determination signal for sliding forward the seat to the display 200. Accordingly, as shown in FIG. 5D, a seat image and one arrow image showing a seat forward-slide direction can be displayed on the display 200.

Accordingly, when the user sees the display 200, the user can easily recognize that the seat can be moved forward when he/she presses the first switch cover 111 with the hand on the seat forward-slide operation region 117-4 of the first switch cover 111.

The 1-5 touch sensor 113-5 is connected to the first sub-controller 114 to be able to output a signal and is disposed in a seat cushion front-up operation region 117-5 of the first switch cover 111, that is, in the region defined at the front portion of the bottom of the first switch cover 111.

Accordingly, when a user puts his/her hand on the seat cushion front-up operation region 117-5 of the first switch cover 111, the 1-5 touch sensor 113-5 therein senses the touch and a sensing signal is output from the 1-5 touch sensor 113-5 to the first sub-controller 114.

When the first sub-controller 114 receives the sensing signal from the 1-5 touch sensor 113-5, the first sub-controller 114 determines the operation direction of the power seat and the operation direction of the switch according to the sensing signal of the 1-5 touch sensor 113-5 to move up the front of the seat cushion and transmits a determination signal to the main controller 116.

Figure 5E:
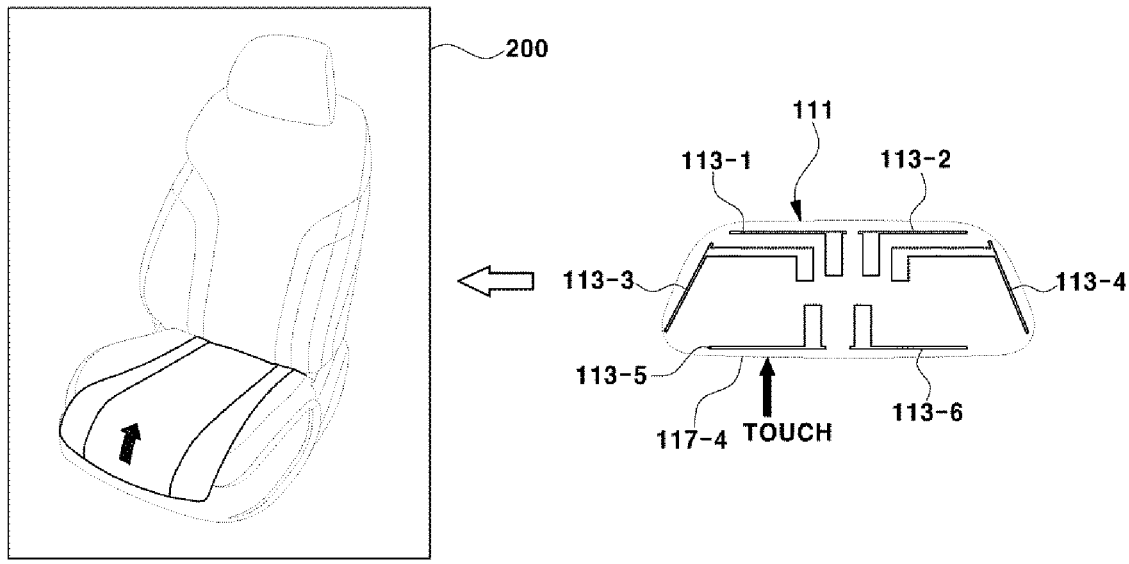

Further, the main controller 116 transmits a control signal for a display instruction according to the determination signal for moving up the front of the seat cushion to the display 200. Accordingly, as shown in FIG. 5E, a seat image and one arrow image showing a seat cushion front-up direction can be displayed on the display 200.

Accordingly, when the user sees the display 200, the user can easily recognize that the front of the seat cushion can be moved upward when he/she presses the first switch cover 111 with the hand on the seat cushion front-up operation region 117-5 of the first switch cover 111.

The 1-6 touch sensor 113-6 is connected to the first sub-controller 114 to be able to output a signal and is disposed in a seat-up operation region 117-6 of the first switch cover 111, that is, in the region defined at the rear portion of the bottom of the first switch cover 111.

Accordingly, when a user puts his/her hand on the seat-up operation region 117-6 of the first switch cover 111, the 1-6 touch sensor 113-6 therein senses the touch and a sensing signal is output from the 1-6 touch sensor 113-6 to the first sub-controller 114.

When the first sub-controller 114 receives the sensing signal from the 1-6 touch sensor 113-6, the first sub-controller 114 determines the operation direction of the power seat and the operation direction of the switch according to the sensing signal of the 1-6 touch sensor 113-6 to move up the seat and transmits a determination signal to the main controller 116.

Figure 5F:
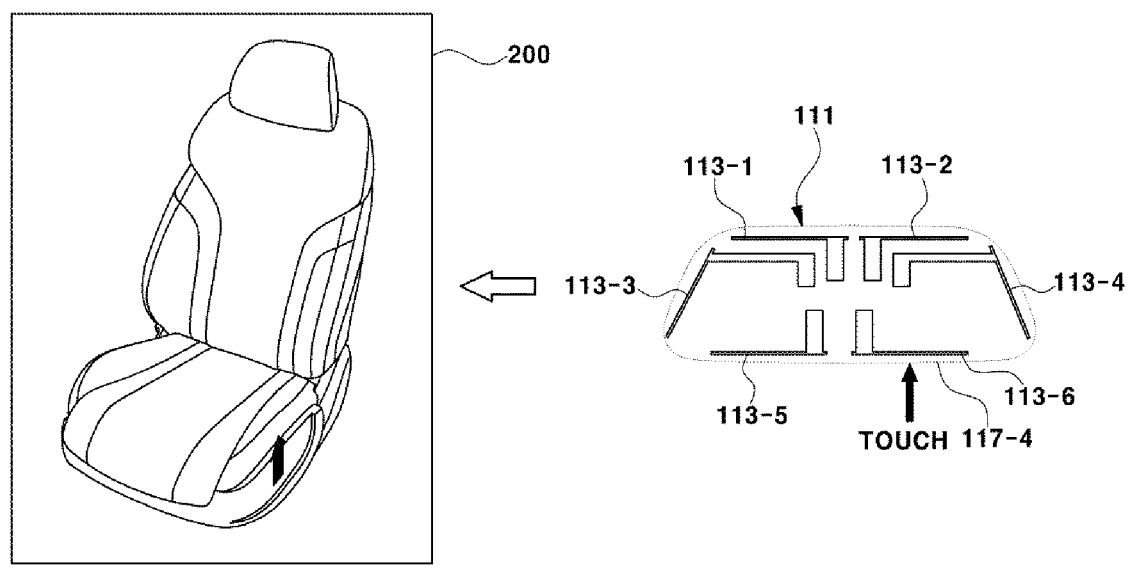

Further, the main controller 116 transmits a control signal for a display instruction according to the determination signal for moving up the seat to the display 200. Accordingly, as shown in FIG. 5F, a seat image and one arrow image showing a seat-up direction can be displayed on the display 200.

Accordingly, when the user sees the display 200, the user can easily recognize that the seat can be moved up when he/she presses the first switch cover 111 with the hand on the seat-up operation region 117-6 of the first switch cover 111.

Figure 6:
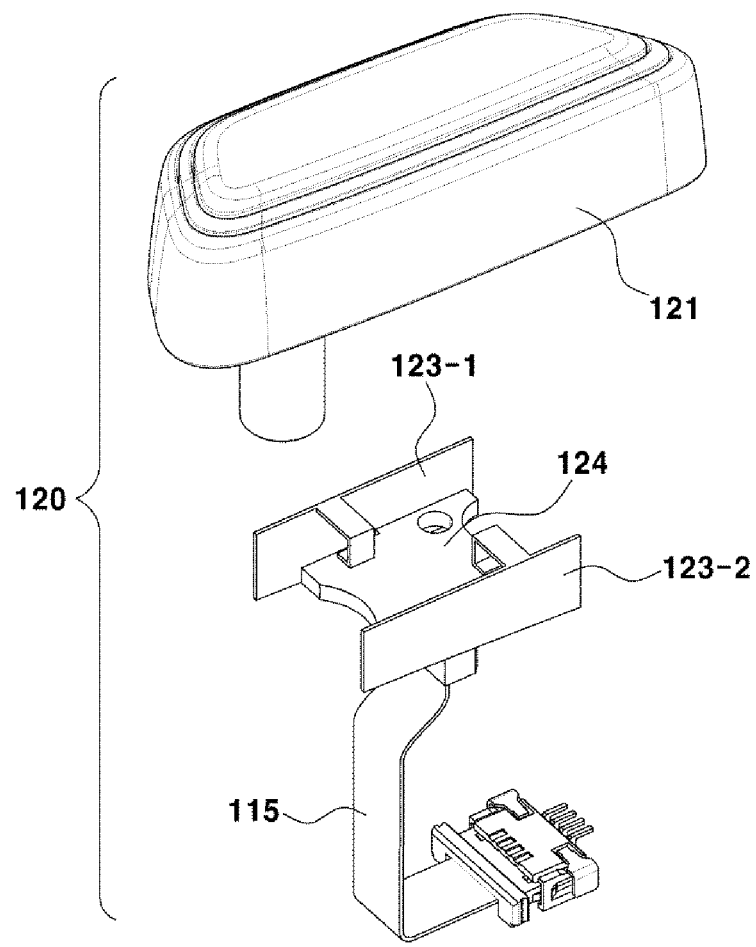
FIG. 6 is an exploded perspective view showing a second switch of the switch module according to the present disclosure.
Figure 7:
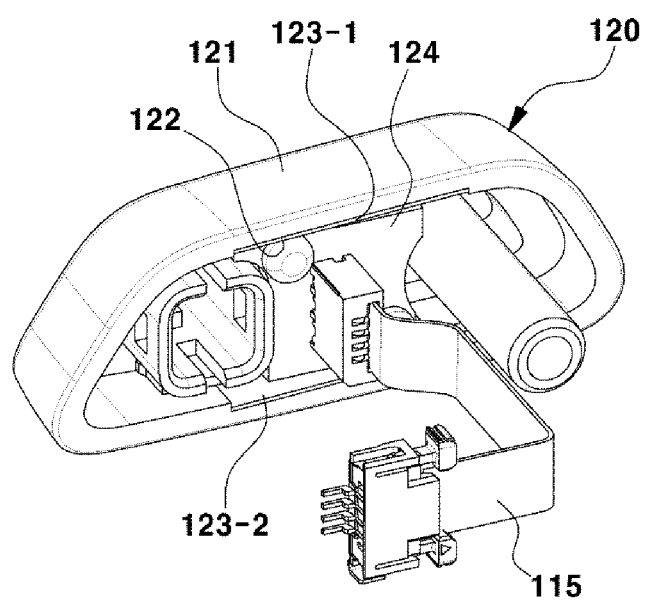
FIGS. 7 and 8 are assembled perspective views showing the second switch of the switch module according to the present disclosure.
Figure 8:
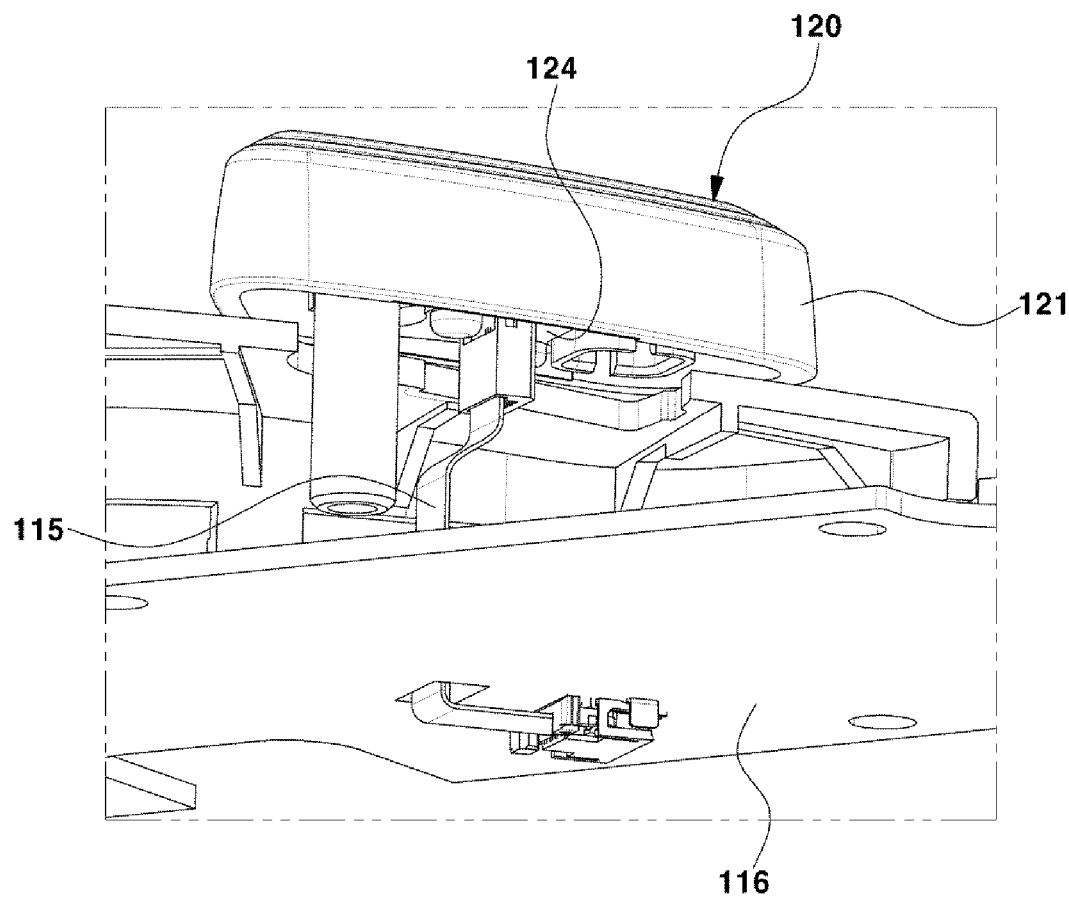

FIGS. 6 to 8 are views showing the second switch of the switch module according to the present disclosure and the assembled state, in which reference numeral 120 indicates the second switch.

The sliding-type second switch 120 is provided for reclining the seatback and includes a second switch cover 121 forming the outer shape.

Two or more touch sensor insertion grooves 122 are formed at front and rear positions on the inner surface of the second switch cover 121.

Accordingly, a plurality of touch sensors and a second sub-controller 124 to which the touch sensors are connected to be able to output signals can be disposed inside the second switch cover 121.

As shown in FIG. 7, the touch sensors are inserted in the touch sensor insertion grooves 122 of the second switch cover 122 and the second sub-controller 124 to which the touch sensors are connected to be able to output signals is disposed at the center region of the inner surface of the second switch cover 121.

As shown in FIG. 8, the second sub-controller 124 is connected to the main controller 116 through a flexible cable 115 to be able to transmit a signal.

The touch sensors connected to the second sub-controller 124 inside the second switch cover 121 may include a first (2-1) touch sensor 123-1 and a second (2-2) touch sensor 123-2.

The 2-1 touch sensor 123-1 is connected to the second sub-controller 124 to be able to output a signal and is disposed in a seatback backward-reclining operation region 127-1 of the second switch cover 121, that is, in the region defined at the front of the second switch cover 121.

Accordingly, when a user puts his/her hand on the seatback backward-reclining operation region 127-1 of the second switch cover 121, the 2-1 touch sensor 123-1 therein senses the touch and a sensing signal is output from the 2-1 touch sensor 123-1 to the second sub-controller 124.

When the second sub-controller 124 receives the sensing signal from the 2-1 touch sensor 123-1, the second sub-controller 124 determines the operation direction of the power seat and the operation direction of the switch according to the sensing signal of the 2-1 touch sensor 123-1 to recline backward the seatback and transmits a determination signal to the main controller 116.

Figure 9A:
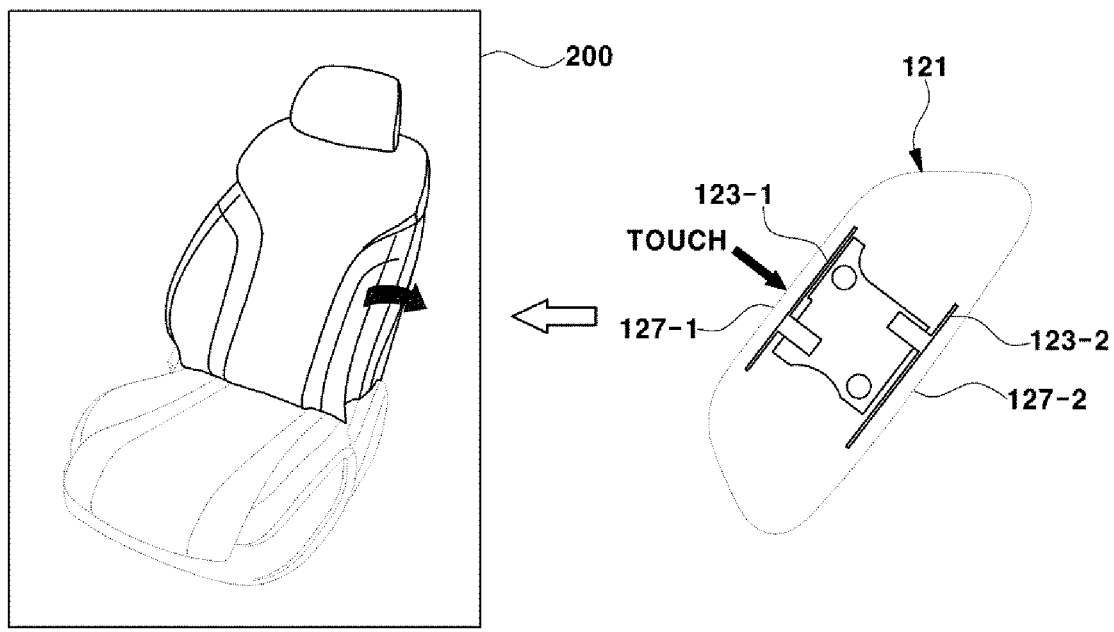
FIGS. 9A and 9B are views showing that an image showing operation directions of a power seat is displayed in different ways on a display by sensing by two touch sensors disposed in the second switch according to the present disclosure.

Further, the main controller 116 transmits a control signal for a display instruction according to the determination signal for reclining backward the seatback to the display 200. Accordingly, as shown in FIG. 9A, a seat image and one arrow image showing a seatback backward-reclining direction can be displayed on the display 200.

Accordingly, when the user sees the display 200, the user can easily recognize that the front of the seatback can be reclined backward when he/she presses the second switch cover 121 with the hand on the seatback backward-reclining operation region 127-1 of the second switch cover 121.

The 2-2 touch sensor 123-2 is connected to the second sub-controller 124 to be able to output a signal and is disposed in a seatback forward-reclining operation region 127-2 of the second switch cover 121, that is, in the region defined at the rear of the second switch cover 121.

Accordingly, when a user puts his/her hand on the seatback forward-reclining operation region 127-2 of the second switch cover 121, the 2-2 touch sensor 123-2 therein senses the touch and a sensing signal is output from the 2-2 touch sensor 123-2 to the second sub-controller 124.

When the second sub-controller 124 receives the sensing signal from the 2-2 touch sensor 123-2, the second sub-controller 124 determines the operation direction of the power seat and the operation direction of the switch according to the sensing signal of the 2-2 touch sensor 123-2 to recline forward the seatback and transmits a determination signal to the main controller 116.

Figure 9B:
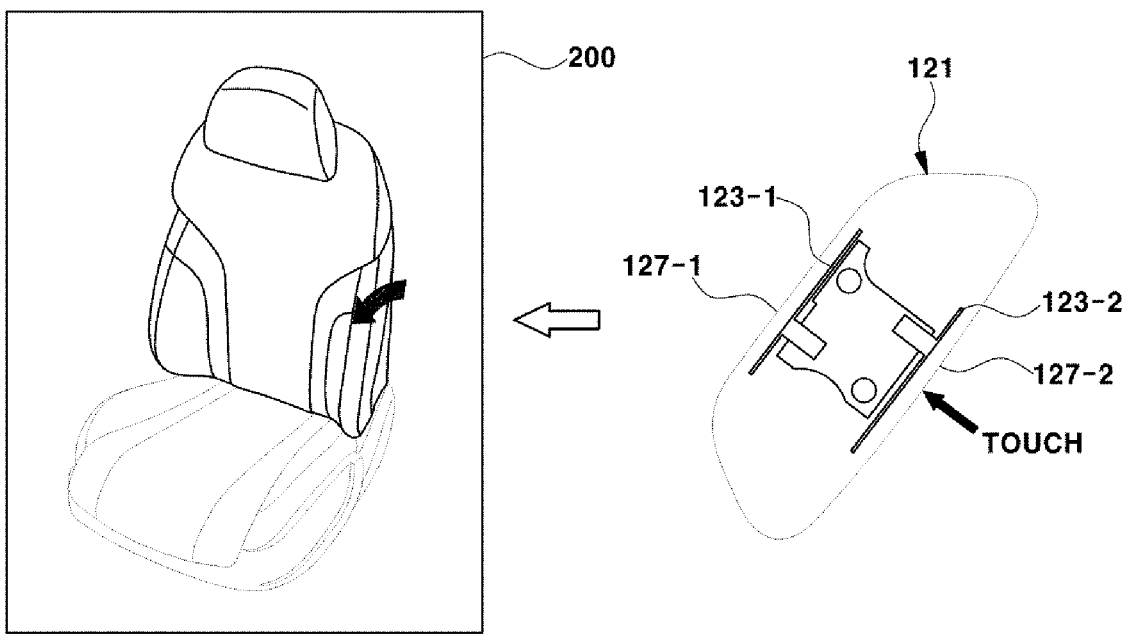

Further, the main controller 116 transmits a control signal for a display instruction according to the determination signal for reclining forward the seatback to the display 200. Accordingly, as shown in FIG. 9B, a seat image and one arrow image showing a seatback forward-reclining direction can be displayed on the display 200.

Accordingly, when the user sees the display 200, the user can easily recognize that the front of the seatback can be reclined forward when he/she presses the second switch cover 121 with the hand on the seatback forward-reclining operation region 127-2 of the second switch cover 121.

Figure 10:
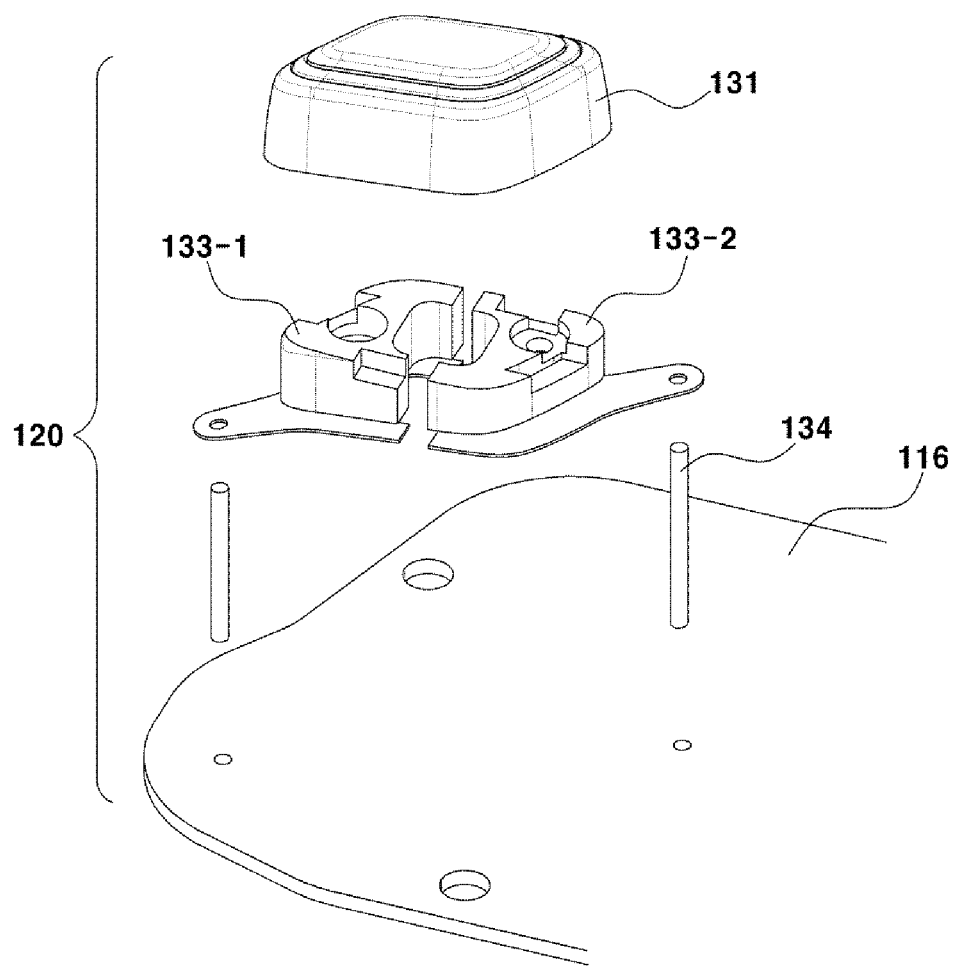
FIG. 10 is an exploded perspective view showing a third switch of the switch module according to the present disclosure.
Figure 11:
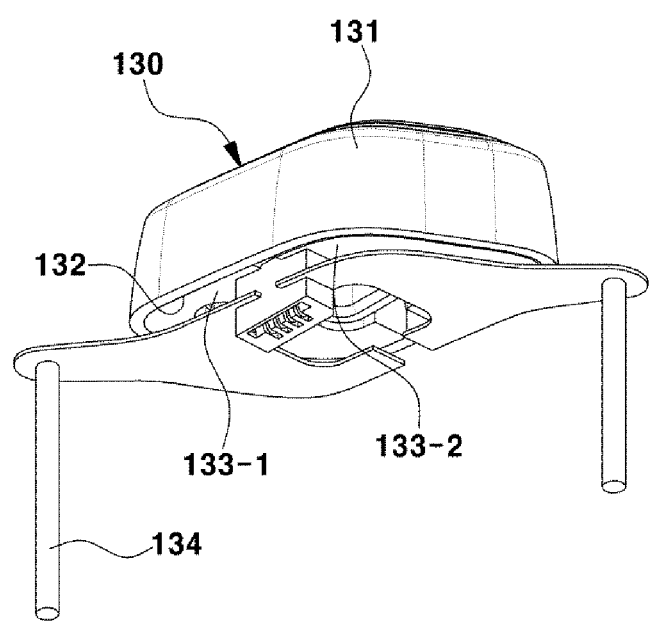
FIGS. 11 and 12 are assembled perspective views showing the third switch of the switch module according to the present disclosure.
Figure 12:
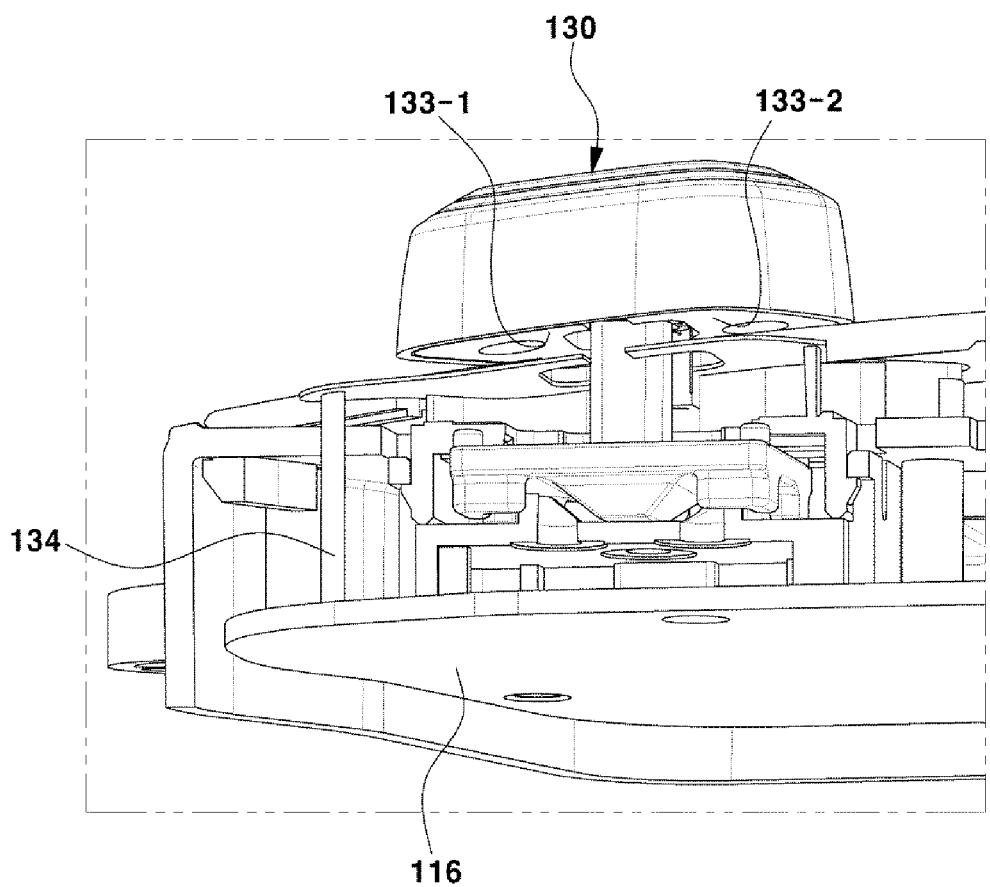

FIGS. 10 to 12 are views showing the third switch of the switch module according to the present disclosure and the assembled state, in which reference numeral 130 indicates the third switch.

The sliding-type third switch 130 is provided for adjusting extension of the front of the seat cushion and includes a third switch cover 131 forming the outer shape.

Two or more touch sensor insertion grooves 132 are formed at front and rear positions on the inner surface of the third switch cover 131.

As shown in FIG. 11, a first (3-1) touch sensor 133-1 and a second (3-2) touch sensor 133-2 are inserted in the touch sensor insertion grooves 132 formed at the front and rear positions on the inner surface of the third switch cover 131.

As shown in FIG. 12, the 3-1 touch sensor 133-1 and the 3-2 touch sensor 133-2 may be connected to the main controller 116 through a conductive spring 134, a conductive pin, or the like to be able to transmit a signal.

The 3-1 touch sensor 133-1 is connected to the main controller 116 through the conductive spring 134 to be able to output a signal and is disposed in a backward extension operation region 137-1 of the third switch cover 131, that is, in the region defined at the front surface of the third switch cover 131.

Accordingly, when a user puts his/her hand on the backward extension operation region 137-1 of the third switch cover 131, the 3-1 touch sensor 133-1 therein senses the touch and a sensing signal is output from the 3-1 touch sensor 133-1 to the main controller 116 through the conductive spring 134.

The main controller 116 determines the operation direction of the power seat and the operation direction of the switch according to the sensing signal of the 3-1 touch sensor 133-1 to extend backward the front of the seat cushion.

Figure 13A:
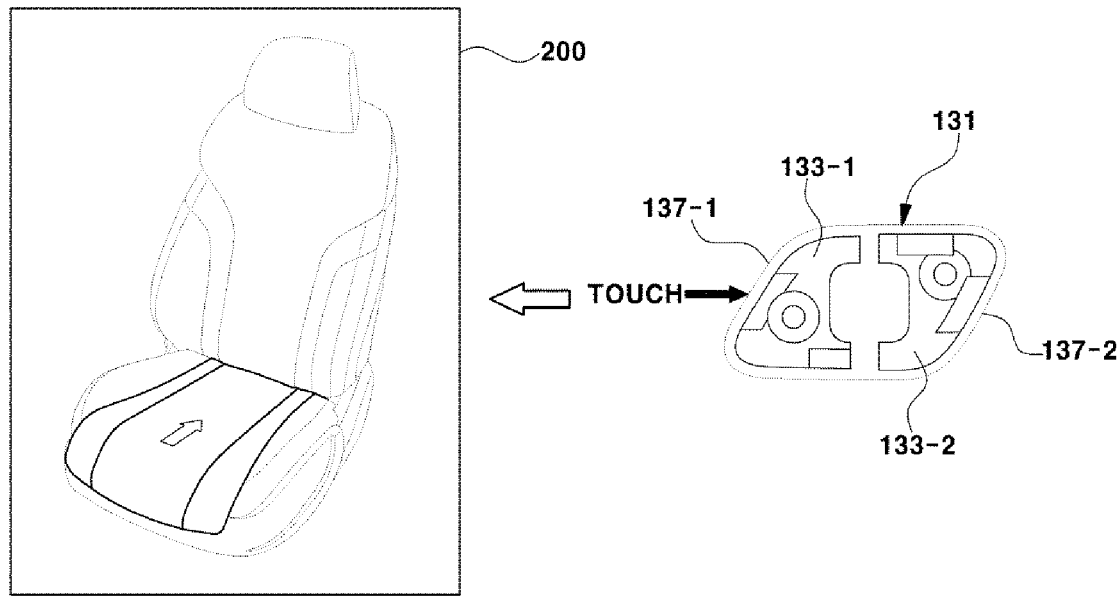
FIGS. 13A and 13B are views showing that an image showing operation directions of a power seat is displayed in different ways on a display by sensing by two touch sensors disposed in the third switch according to the present disclosure.

Further, the main controller 116 transmits a control signal for a display instruction according to the determination signal for extending backward the front of the seat cushion to the display 200. Accordingly, as shown in FIG. 13A, a seat image and one arrow image showing a seat cushion front-backward extension direction can be displayed on the display 200.

Accordingly, when the user sees the display 200, the user can easily recognize that backward extension that decreases the length of the front of the seat cushion can be performed when he/she presses the third switch cover 131 with the hand on the backward extension operation region 137-1 of the third switch cover 131.

The 3-2 touch sensor 133-2 is connected to the main controller 116 through the conductive spring 134 to be able to output a signal and is disposed in a forward extension operation region 137-2 of the third switch cover 131, that is, in the region defined at the rear surface of the third switch cover 131.

Accordingly, when a user puts his/her hand on the forward extension operation region 137-2 of the third switch cover 131, the 3-2 touch sensor 133-2 therein senses the touch and a sensing signal is output from the 3-2 touch sensor 133-2 to the main controller 116 through the conductive spring 134.

The main controller 116 determines the operation direction of the power seat and the operation direction of the switch according to the sensing signal of the 3-2 touch sensor 133-2 to extend forward the front of the seat cushion.

Figure 13B:
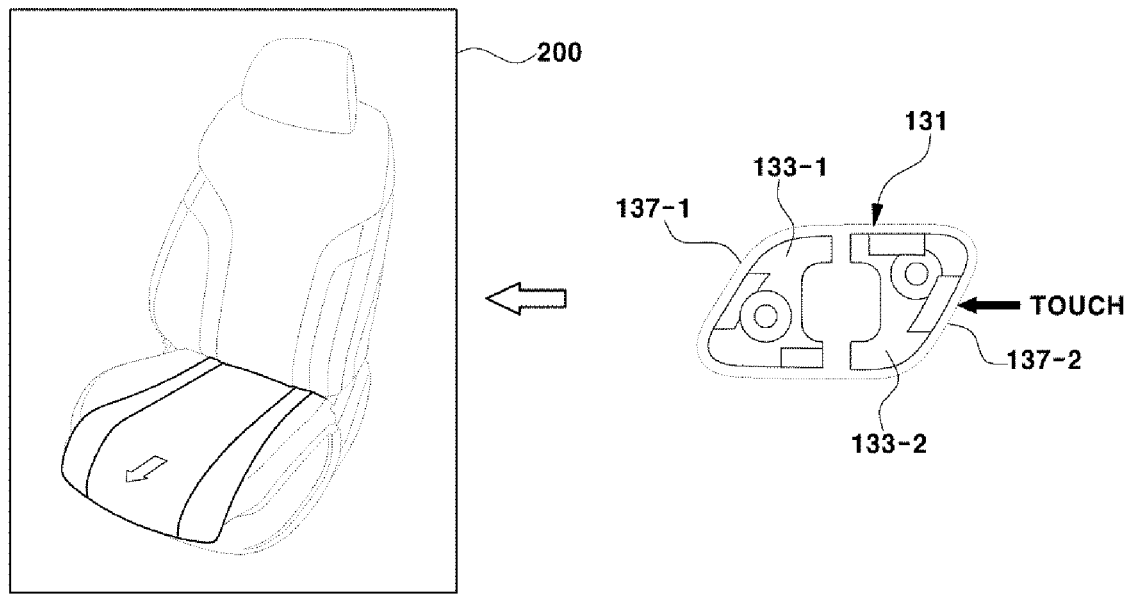

Further, the main controller 116 transmits a control signal for a display instruction according to the determination signal for extending forward the front of the seat cushion to the display 200. Accordingly, as shown in FIG. 13B, a seat image and one arrow image showing a seat cushion front-forward extension direction can be displayed on the display 200.

Accordingly, when the user sees the display 200, the user can easily recognize that forward extension that extends the front of the seat cushion can be performed when he/she presses the third switch cover 131 with the hand on the forward extension operation region 137-2 of the third switch cover 131.

Figure 14:
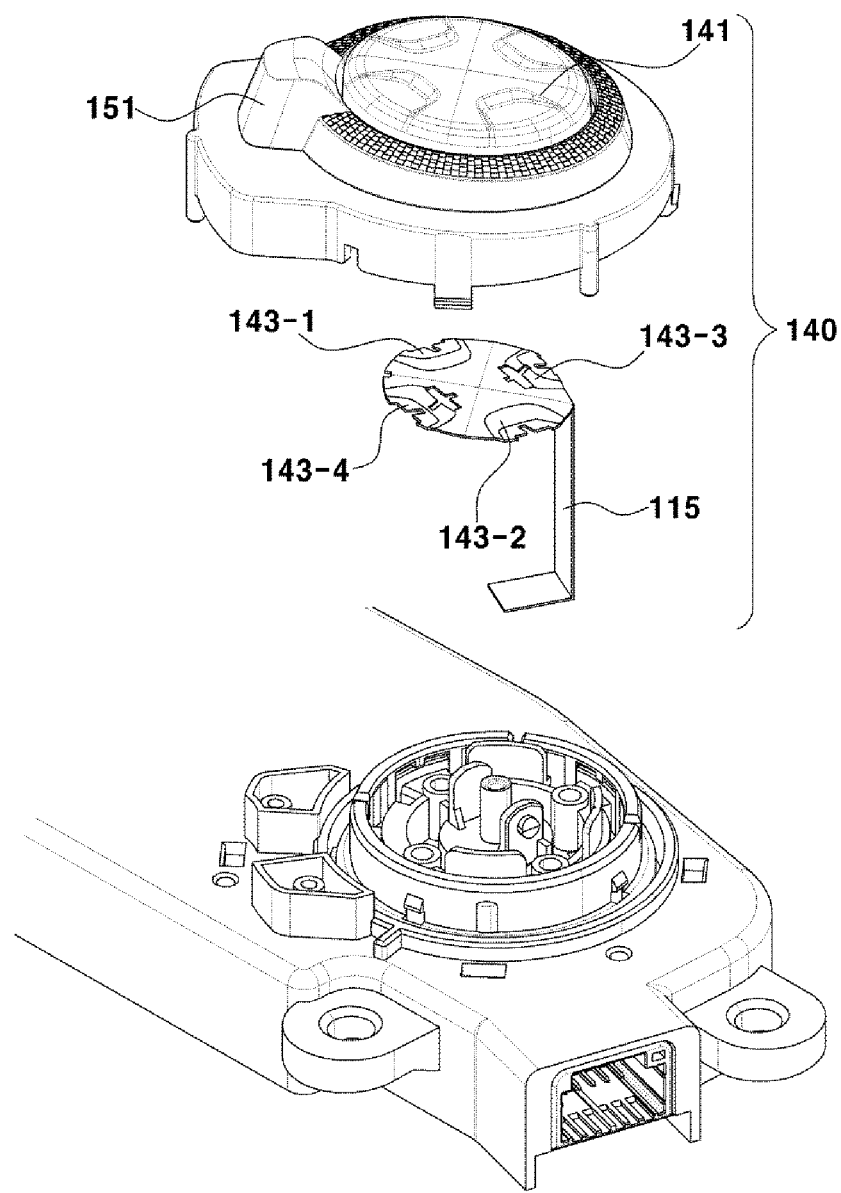
FIGS. 14 and 15 are perspective views showing a fourth switch of the switch module according to the present disclosure.
Figure 15:
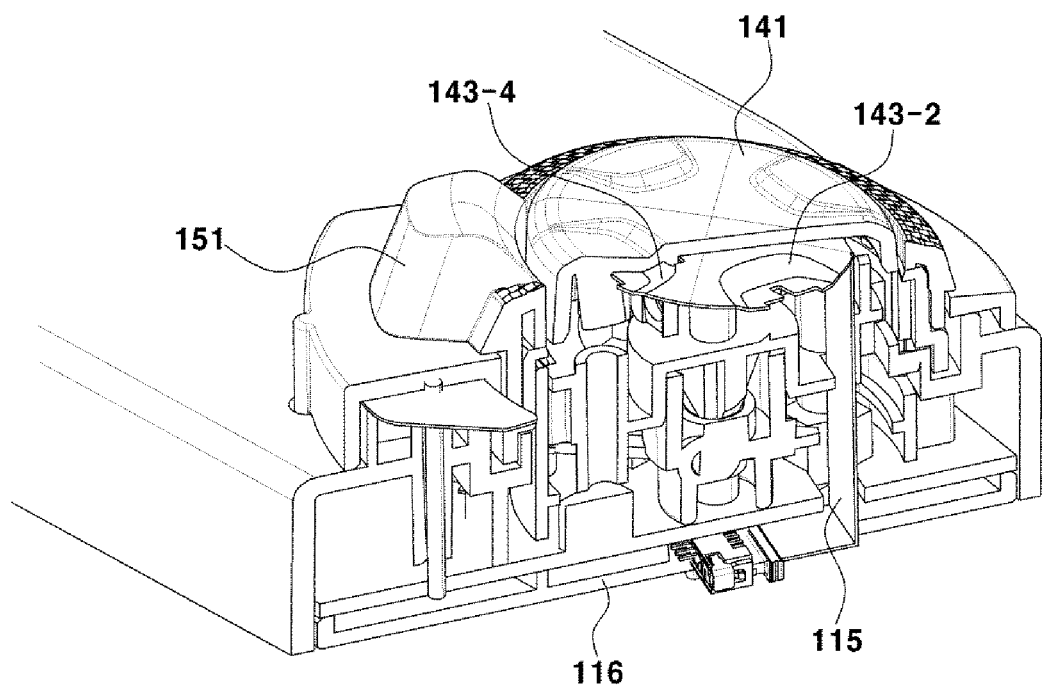

FIGS. 14 and 15 are views showing the fourth switch of the switch module according to the present disclosure and the assembled state, in which reference numeral 140 indicates the fourth switch.

The push-type fourth switch 140 is provided for adjusting the supporting direction of a lumber support disposed in the seatback and includes a fourth switch cover 141 forming the outer shape.

The fourth switch cover 141, as shown in FIGS. 14 and 15, has a lumber support forward-protrusion operation region 141-1, a lumber support backward-contraction operation region 141-2, a lumber support-up operation region 141-3, and a lumber support-down operation region 141-4.

In particular, a first (4-1) touch sensor 143-1 connected to the main controller 116 to be able to output a signal is disposed in the lumber support forward-protrusion operation region 141-1 of the fourth switch cover 141, and a second (4-2) touch sensor 143-2 connected to the main controller 116 to be able to output a signal is disposed in the lumber support backward-contraction operation region 141-2 of the fourth switch cover 141.

Further, a third (4-3) touch sensor 143-3 connected to the main controller 116 to be able to output a signal is disposed in the lumber support-up operation region 141-3 of the fourth switch cover 141, and a fourth (4-4) touch sensor 143-4 connected to the main controller 116 to be able to output a signal is disposed in the lumber support-down operation region 141-4 of the fourth switch cover 141.

An integrated signal output path of the a 4-1 touch sensor 143-1, the 4-2 touch sensor 143-2, the 4-3 touch sensor 143-3, and the 4-4 touch sensor 143-4 is connected to the main controller 116 by a flexible cable 115 to be able to transmit a signal.

Accordingly, when a user puts his/her hand on the lumber support forward-protrusion operation region 141-1 of the fourth switch cover 141, the 4-1 touch sensor 143-1 therein senses the touch and a sensing signal is output from the 4-1 touch sensor 143-1 to the main controller 116 through the flexible cable 115.

The main controller 116 determines the operation direction of the power seat and the operation direction of the switch according to the sensing signal of the 4-1 touch sensor 143-1 to protrude forward the lumber support.

Figure 16A:
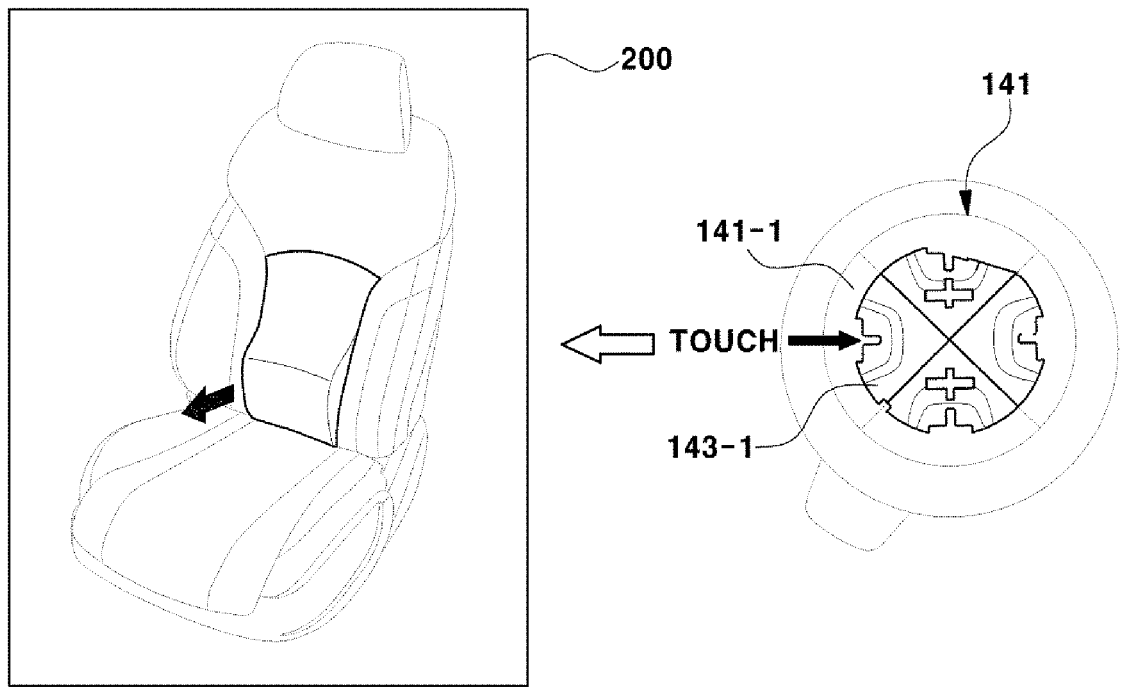
FIGS. 16A, 16B, 16C, and 16D are views showing that an image showing operation directions of a power seat is displayed in different ways on a display by sensing by touch sensors disposed in the fourth switch according to the present disclosure.

Further, the main controller 116 transmits a control signal for a display instruction according to the determination signal for protruding forward the lumber support to the display 200. Accordingly, as shown in FIG. 16A, a seat image and one arrow image showing a lumber support forward-protrusion direction can be displayed on the display 200.

Accordingly, when the user sees the display 200, the user can easily recognize that the lumber support protrudes forward when he/she presses the fourth switch cover 141 with the hand on the lumber support forward-protrusion operation region 141-1 of the fourth switch cover 141.

Alternatively, when a user puts his/her hand on the lumber support backward-contraction operation region 141-2 of the fourth switch cover 141, the 4-2 touch sensor 143-2 therein senses the touch and a sensing signal is output from the 4-2 touch sensor 143-2 to the main controller 116 through the flexible cable 115.

The main controller 116 determines the operation direction of the power seat and the operation direction of the switch according to the sensing signal of the 4-2 touch sensor 143-2 to contract backward the lumber support.

Figure 16B:
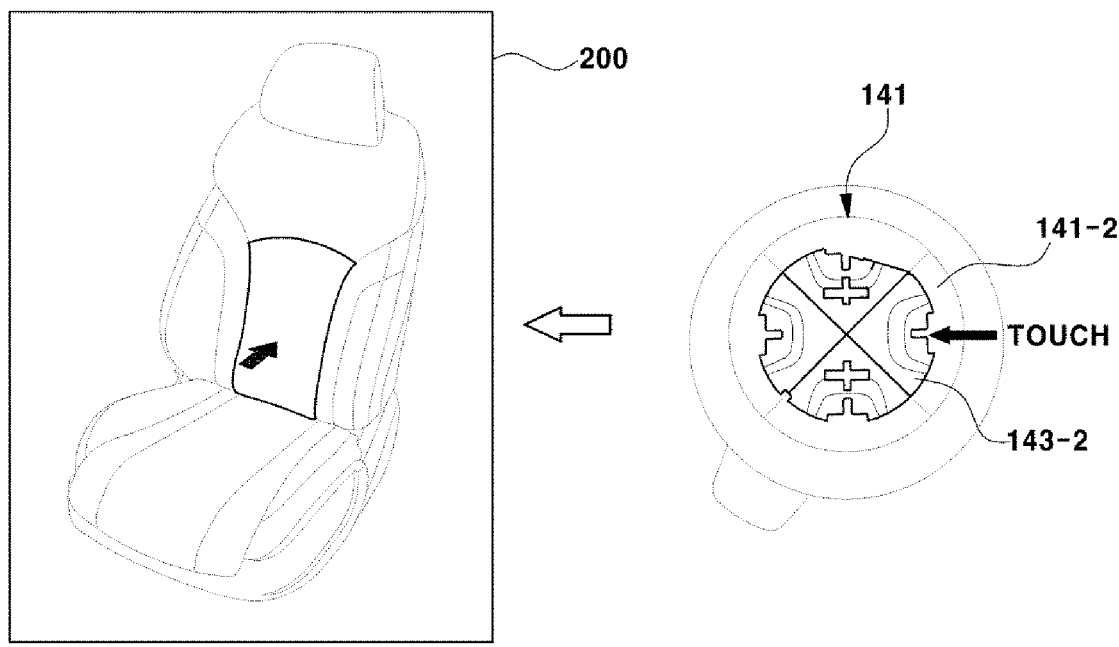

Further, the main controller 116 transmits a control signal for a display instruction according to the determination signal for contracting backward the lumber support to the display 200. Accordingly, as shown in FIG. 16B, a seat image and one arrow image showing a lumber support backward-contraction direction can be displayed on the display 200.

Accordingly, when the user sees the display 200, the user can easily recognize that the lumber support contracts backward when he/she presses the fourth switch cover 141 with the hand on the lumber support backward-contraction operation region 141-2 of the fourth switch cover 141.

Alternatively, when a user puts his/her hand on the lumber support-up operation region 141-3 of the fourth switch cover 141, the 4-3 touch sensor 143-3 therein senses the touch and a sensing signal is output from the 4-3 touch sensor 143-3 to the main controller 116 through the flexible cable 115.

The main controller 116 determines the operation direction of the power seat and the operation direction of the switch according to the sensing signal of the 4-3 touch sensor 143-3 to move up the lumber support.

Figure 16C:
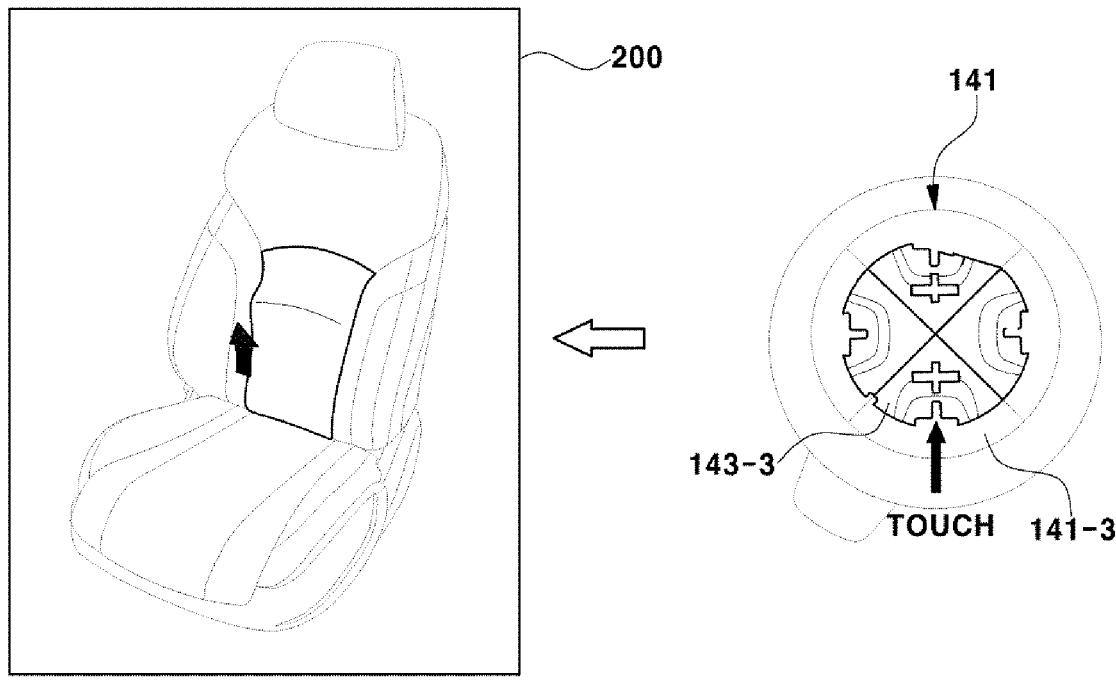

Further, the main controller 116 transmits a control signal for a display instruction according to the determination signal for moving up the lumber support to the display 200. Accordingly, as shown in FIG. 16C, a seat image and one arrow image showing a lumber support-up direction can be displayed on the display 200.

Accordingly, when the user sees the display 200, the user can easily recognize that the lumber support moves up when he/she presses the fourth switch cover 141 with the hand on the lumber support-up operation region 141-3 of the fourth switch cover 141.

Alternatively, when a user puts his/her hand on the lumber support-down operation region 141-4 of the fourth switch cover 141, the 4-4 touch sensor 143-4 therein senses the touch and a sensing signal is output from the 4-4 touch sensor 143-4 to the main controller 116 through the flexible cable 115.

The main controller 116 determines the operation direction of the power seat and the operation direction of the switch according to the sensing signal of the 4-4 touch sensor 143-4 to move down the lumber support.

Figure 16D:
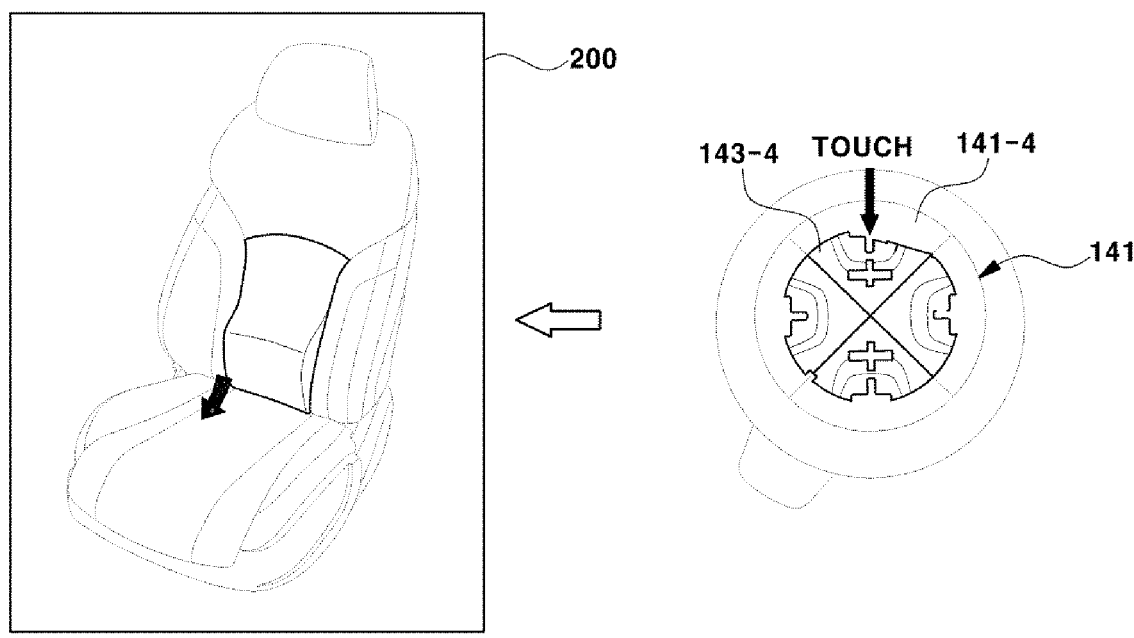

Further, the main controller 116 transmits a control signal for a display instruction according to the determination signal for moving down the lumber support to the display 200. Accordingly, as shown in FIG. 16D, a seat image and one arrow image showing a lumber support-down direction can be displayed on the display 200.

Accordingly, when the user sees the display 200, the user can easily recognize that the lumber support moves down when he/she presses the fourth switch cover 141 with the hand on the lumber support-down operation region 141-4 of the fourth switch cover 141.

Figure 17:
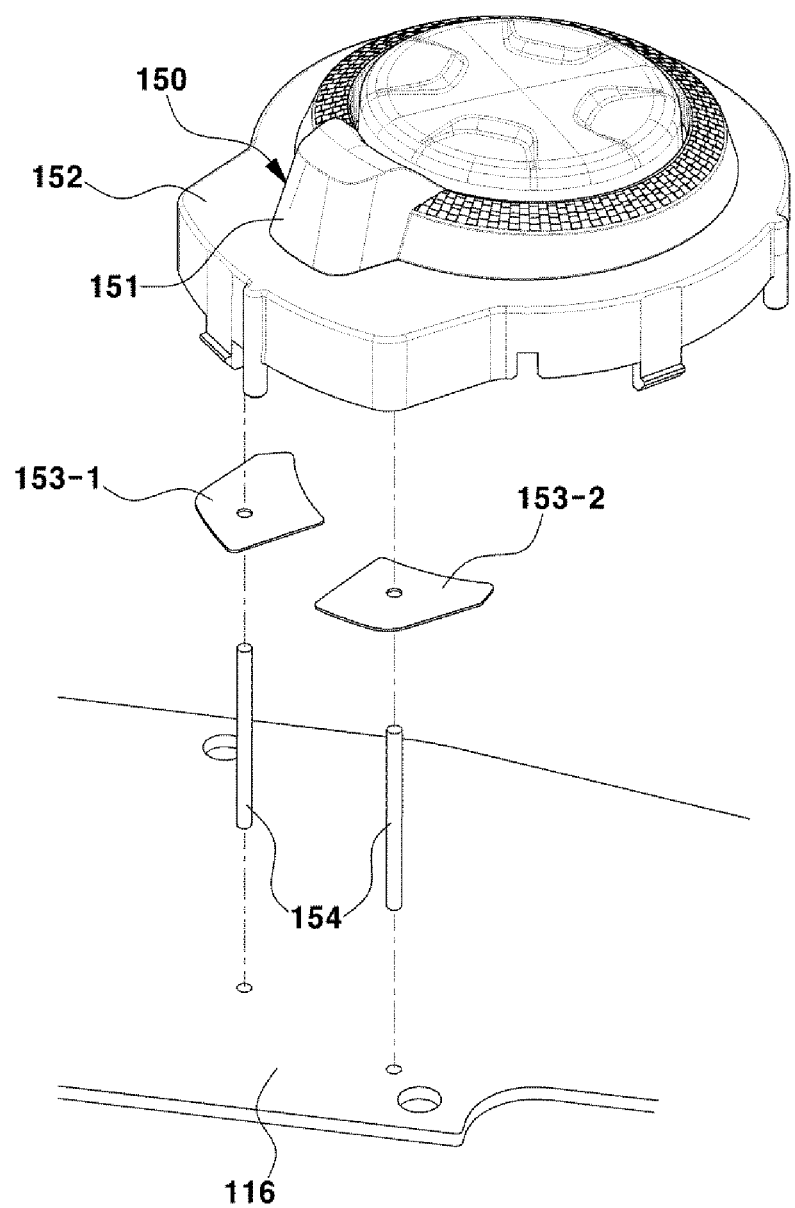
FIGS. 17 and 18 are perspective views showing a fifth switch of the switch module according to the present disclosure.
Figure 18:
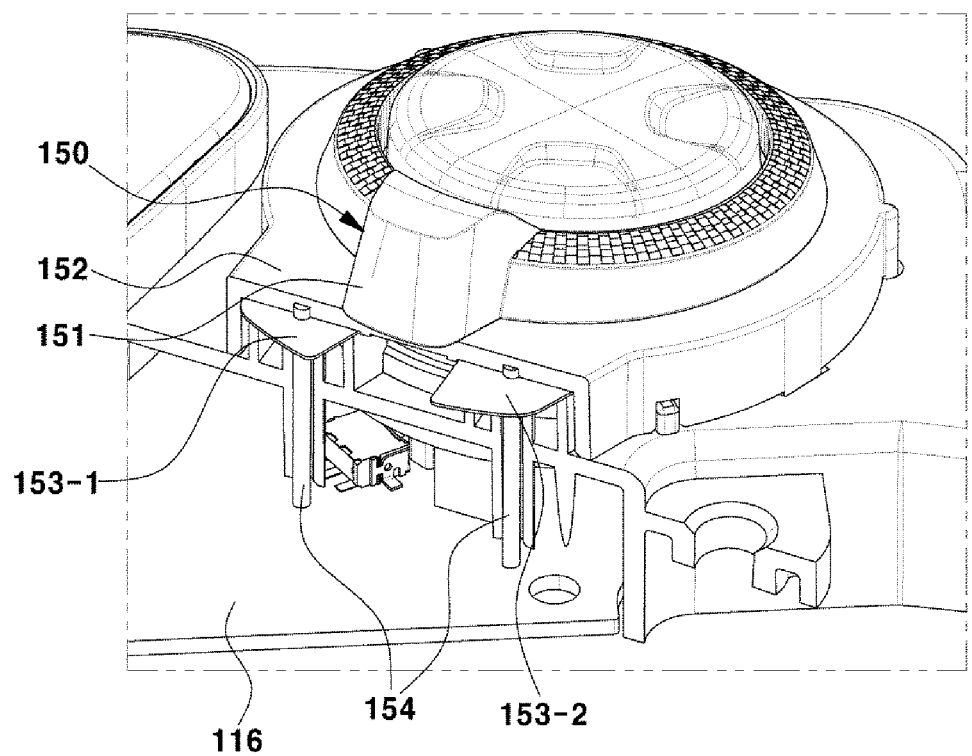

FIGS. 17 and 18 are views showing the fifth switch of the switch module according to the present disclosure and the assembled state, in which reference numeral 150 indicates the fifth switch.

The rotary knob-type fifth switch 150 is provided for adjusting the bolster angle of the seatback, and as shown in FIG. 17, includes a fifth switch cover 151 that may be rotatably disposed over the edge of the fourth switch cover 141.

In particular, as shown in FIG. 17, a first (5-1) touch sensor 153-1 is disposed inside a garnish plate 152 adjacent to a first side of the fifth switch cover 151 and a second (5-2) touch sensor 153-2 is disposed inside a garnish plate 152 adjacent to a second side of the fifth switch 151.

The 5-1 touch sensor 153-1 and the 5-2 touch sensor 153-2 are connected to the main controller by a conductive spring 154, a conductive pin, or the like to be able to output a signal.

Accordingly, when a user puts his/her hand on the garnish plate 152 at the first side of the fifth switch cover 151, the 5-1 touch sensor 153-1 therein senses the touch and a sensing signal is output from the 5-1 touch sensor 153-1 to the main controller 116 through the conductive spring 154.

The main controller 116 determines the operation direction of the power seat and the operation direction of the switch according to the sensing signal of the 5-1 touch sensor 153-1 to move inward bolsters.

Figure 19A:
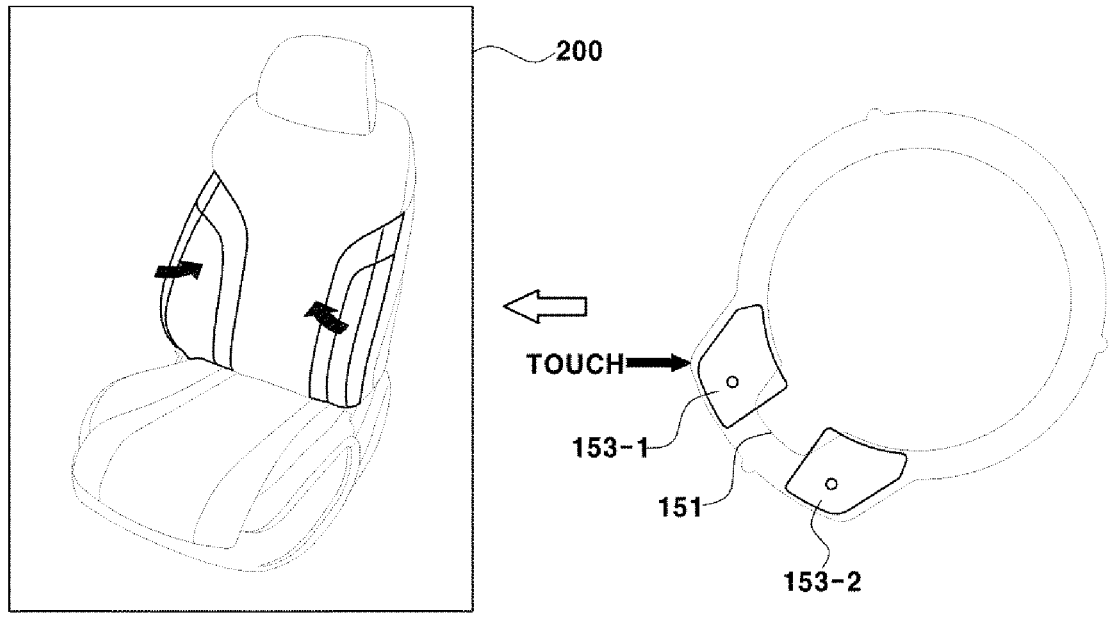
FIGS. 19A and 19B are views showing that an image showing operation directions of a power seat is displayed in different ways on a display by sensing by touch sensors disposed in the fifth switch according to the present disclosure.

Further, the main controller 116 transmits a control signal for a display instruction according to the determination signal for moving inward the bolsters to the display 200. Accordingly, as shown in FIG. 19A, a seat image and one arrow image showing a bolster-inward movement direction can be displayed on the display 200.

Accordingly, when the user sees the display 200, the user can easily recognize that the bolsters can move inward when he/she rotates the fifth switch 151 to the first side.

However, when a user puts his/her hand on the garnish plate 152 at the second side of the fifth switch cover 151, the 5-2 touch sensor 153-2 therein senses the touch and a sensing signal is output from the 5-2 touch sensor 153-2 to the main controller 116 through the conductive spring 154.

The main controller 116 determines the operation direction of the power seat and the operation direction of the switch according to the sensing signal of the 5-2 touch sensor 153-2 to move outward the bolsters.

Figure 19B:
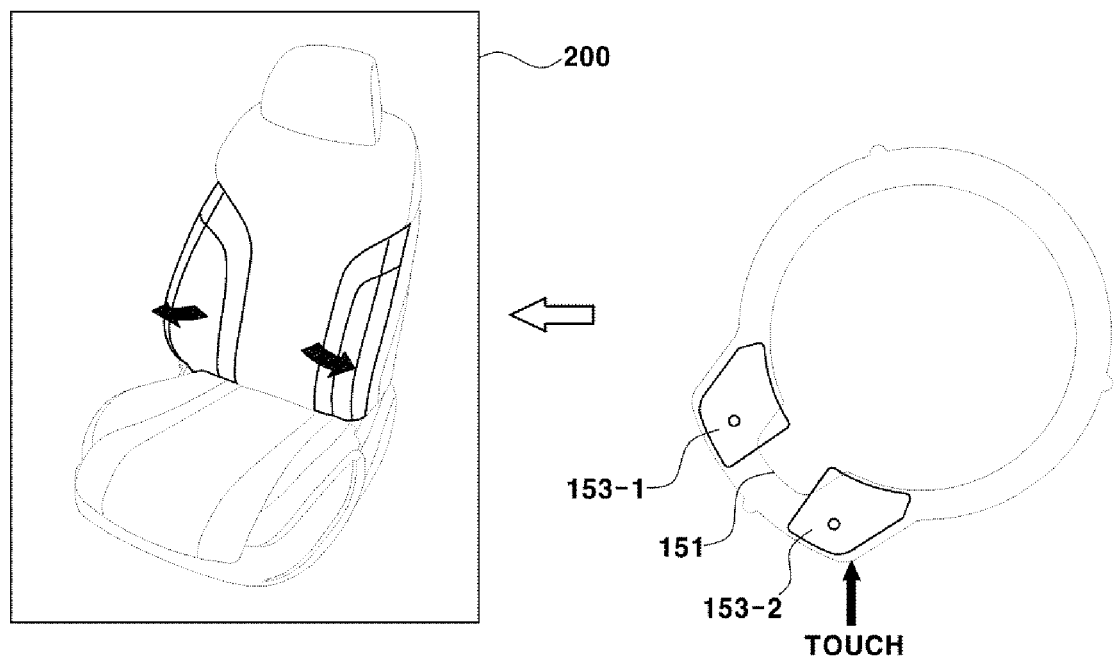
Figure 20:
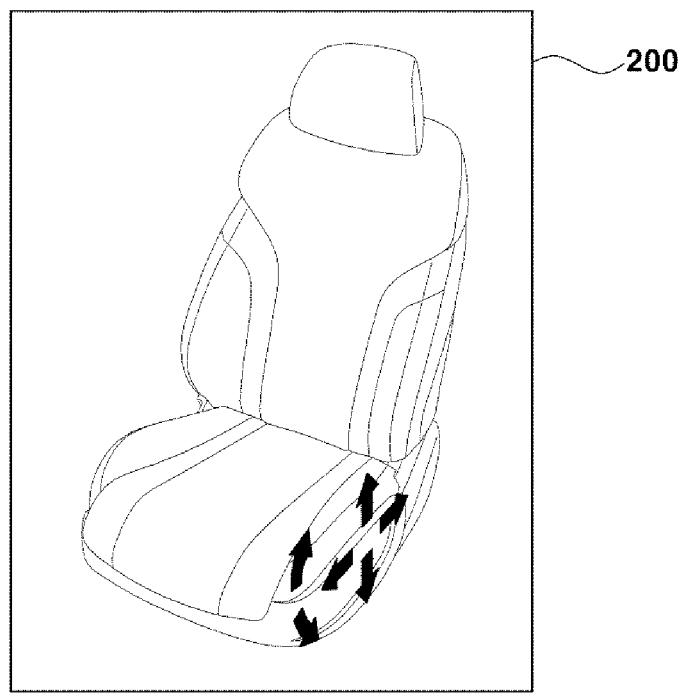
FIG. 20 is a schematic view showing an example in which an image showing operation directions of a power seat is displayed on a display in the related art.

Further, the main controller 116 transmits a control signal for a display instruction according to the determination signal for moving outward the bolsters to the display 200. Accordingly, as shown in FIG. 19B, a seat image and one arrow image showing a bolster-outward movement direction can be displayed on the display 200.

Accordingly, when the user sees the display 200, the user can easily recognize that the bolsters can move outward when he/she rotates the fifth switch 151 to the second side.

When a hand of the user touches two or more touch sensors and the two or touch sensors all sense the touch, two or more arrows showing the operation direction of the power seat and the operation direction of the switch can be displayed on the display.

As described above, a user can accurately recognize the current selection state and operation direction of the switches and the operation direction of the power seat by the operation of the switches by looking at the seat and arrow images displayed on the display, whereby the user can more conveniently operate the switches.

While a number of exemplary aspects and embodiments have been discussed above, those of skill in the art will recognize that still further modifications, permutations, additions and sub-combinations thereof of the features of the disclosed embodiments are still possible.

The invention claimed is:

1. A device having a sliding switch for operating a power seat of a vehicle, the device comprising:
a switch module including a plurality of sliding switches performing input operations to drive a power seat to a plurality of positions and in desired plurality of directions;
a plurality of touch sensors disposed in each of the sliding switches to detect an operation direction of the seat;
a main controller determining the operation direction of the power seat in response to sensing signals of touch sensors sensing a touch of the touch sensors; and
a display showing the operation direction of the power seat determined by the main controller to a user by indicating the operation direction with an arrow;
wherein the switch module comprises:
a first sliding switch configured to move the power seat forward and backward, move a front of a seat cushion up and down, and adjust a vertical height of the power seat;
a second sliding switch configured to recline a seatback;
a third sliding switch configured to extend the front of the seat cushion;
a push button switch configured to adjust a supporting direction of lumber supports; and
a rotary knob switch configured to adjust a bolster angle of the seatback, in which the switches are disposed in predetermined arrangement.

2. The device of claim 1, wherein the first sliding switch comprises:
a first switch cover having a plurality of touch sensor insertion grooves disposed in a predetermined arrangement on an inner surface;
a first sub-controller disposed inside the first switch cover and connected to the main controller by a flexible cable to transmit a signal;
a first touch sensor disposed in a seat cushion front-down operation region of the first switch cover and connected to the first sub-controller to output a signal;
a second touch sensor disposed in a seat-down operation region of the first switch cover and connected to the first sub-controller to output a signal;
a third touch sensor disposed in a seat backward-slide operation region of the first switch cover and connected to the first sub-controller to be able to output a signal;
a fourth touch sensor disposed in a seat forward-slide operation region of the first switch cover and connected to the first sub-controller to be able to output a signal;
a fifth touch sensor disposed in a seat cushion front-up operation region of the first switch cover and connected to the first sub-controller to be able to output a signal; and
a sixth touch sensor disposed in a seat-up operation region of the first switch cover and connected to the first sub-controller to be able to output a signal.

3. The device of claim 2, wherein the seat cushion front-down operation region is a region at a front portion of a top of the first switch cover,
the seat-down operation region is a region at a rear portion of the top of the first switch cover,
the seat backward-slide operation region is a region at a front of the first switch cover,
the seat forward-slide operation region is a region at a rear of the first switch cover,
the seat cushion front-up operation region is a region at a front portion of a bottom of the first switch cover, and
the seat cushion-up operation region is a region at a rear portion of the bottom of the first switch cover.

4. The device of claim 1, wherein the second sliding switch comprises:
a second switch cover having two or more touch sensor insertion grooves on an inner surface;
a second sub-controller disposed inside the second switch cover and connected to the main controller through a flexible cable to transmit a signal;
a first touch sensor disposed in a seatback backward-reclining operation region of the second switch cover and connected to the second sub-controller to output a signal; and
a second touch sensor disposed in a seatback forward-reclining operation region of the second switch cover and connected to the second sub-controller to output a signal.

5. The device of claim 4, wherein the seatback backward-reclining operation region is a region at a front of the second switch cover, and
the seatback forward-reclining operation region is a region at a rear of the second switch cover.

6. The device of claim 1, wherein the third sliding switch comprises:
a third switch cover having two or more touch sensor insertion grooves on an inner surface;
a first touch sensor disposed in a backward extension operation region of the third switch cover and connected to the main controller to be able to output a signal; and
a second touch sensor disposed in a forward extension operation region of the third switch cover and connected to the main controller to be able to output a signal.

7. The device of claim 6, wherein the first touch sensor on the third sliding switch and the second touch sensor on the third sliding switch are connected to the main controller through a conductive spring to be able to transmit a signal.

8. The device of claim 6, wherein the backward extension operation region is a region at a front surface of the third switch cover, and
the forward extension operation region is a region at a rear surface of the third switch cover.

9. The device of claim 1, wherein the push button switch comprises:

a fourth switch cover having a lumber support forward-protrusion operation region, a lumber support backward-contraction operation region, a lumber support-up operation region, and a lumber support-down operation region;

a first touch sensor disposed in the lumber support forward-protrusion operation region of the fourth switch cover and connected to the main controller to output a signal;

a second touch sensor disposed in the lumber support backward-contraction operation region of the fourth switch cover and connected to the main controller to output a signal;

a third touch sensor disposed in the lumber support-up operation region of the fourth switch cover and connected to the main controller to output a signal; and a fourth touch sensor disposed in the lumber support-down operation region of the fourth switch cover and connected to the main controller to output a signal.

10. The device of claim 9, wherein an integrated signal output path of the first touch sensor on the push button switch, the second touch sensor on the push button switch, the third touch sensor on the push button switch, and the fourth touch sensor on the push button switch are connected to the main controller by a flexible cable to transmit a signal.

11. The device of claim 1, wherein the rotary knob switch comprises:

a fifth switch cover disposed at a predetermined position on an edge of the fourth switch;

a first touch sensor disposed inside a garnish plate adjacent to a first side of the fifth switch and connected to the main controller to output a signal; and a second touch sensor disposed in a garnish plate adjacent to a second side of the fifth switch cover and connected to the main controller to output a signal.

12. The device of claim 11, wherein the first touch sensor on the rotary knob switch and the second touch sensor on the rotary knob switch are connected to the main controller through a conductive spring to transmit a signal.

* * * * *